(12) United States Patent
Long

(10) Patent No.: US 8,548,885 B2
(45) Date of Patent: *Oct. 1, 2013

(54) FIXED INCOME SECURITIES RATINGS VISUALIZATION

(75) Inventor: Catherine Caldwell Long, Rhinebeck, NY (US)

(73) Assignee: Multiple-Markets, Rhinebeck, NY (US)

( * ) Notice: Subject to any disclaimer, the term of this patent is extended or adjusted under 35 U.S.C. 154(b) by 305 days.

This patent is subject to a terminal disclaimer.

(21) Appl. No.: 12/884,729

(22) Filed: Sep. 17, 2010

(65) Prior Publication Data

US 2011/0040665 A1    Feb. 17, 2011

Related U.S. Application Data

(63) Continuation-in-part of application No. 10/303,102, filed on Nov. 25, 2002, now Pat. No. 7,827,080.

(60) Provisional application No. 60/356,472, filed on Feb. 14, 2002.

(51) Int. Cl.
*G06Q 40/04* (2012.01)
*G06Q 40/06* (2012.01)
*G06Q 40/00* (2012.01)

(52) U.S. Cl.
CPC ............... *G06Q 40/00* (2013.01); *G06Q 40/04* (2013.01); *G06Q 40/06* (2013.01)
USPC .............................. 705/35; 705/36 R; 705/37

(58) Field of Classification Search
CPC ........ G06Q 40/04; G06Q 40/06; G06Q 20/10
USPC ................... 705/35, 36 R, 39, 37
See application file for complete search history.

(56) References Cited

U.S. PATENT DOCUMENTS

| | | | |
|---|---|---|---|
| 3,970,992 A * | 7/1976 | Boothroyd et al. ............. | 705/43 |
| 4,346,442 A | 8/1982 | Musmanno ................. | 705/36 R |
| 4,376,978 A | 3/1983 | Musmanno ................. | 705/36 R |
| 4,507,745 A | 3/1985 | Agrawal ....................... | 708/134 |
| 4,868,866 A | 9/1989 | Williams, Jr. .................... | 707/9 |
| 5,083,782 A | 1/1992 | Nilssen ........................... | 705/35 |

(Continued)

OTHER PUBLICATIONS

Eurographics; Tan Toh Fei and Edmond Cyril Prakash; "Volume Visualization of Payoff Regions for Derivatives Risk Management"; 2001; pp. 1-6.*

1—Jameson, Rob, et al., "The Language of Credit", Report on how the new Basle Accord has spawned a new language for the credit industry, *ERisk*, May 2002, pp. 01-04.

2—"Moody's Powerful Run-Up", Market Movers Stock Research, *Ticker*, Jun. 2002, pp. 43-46.

(Continued)

*Primary Examiner* — Ella Colbert

(74) *Attorney, Agent, or Firm* — Pillsbury Winthrop Shaw Pittman LLP

(57) ABSTRACT

An arrangement is provided for enabling online retail fixed income. A fixed income online retail enabling mechanism analyzes a request received from a user to determine the requested operation related to online retail fixed income. If the request is for visualizing information related to securities in one or more fixed income capital markets, visual representations are constructed using color codes and real value ratings converted from corresponding ratings issued from different sources and presented to the user. If the request is for managing account information, the fixed income online retail enabling mechanism facilitates the needs of managing accounts. If the request is related to conducting a transaction related to fixed income securities, the fixed income online retail enabling mechanism performs operations to trade securities in one or more fixed income capital markets.

24 Claims, 32 Drawing Sheets

(56) References Cited

U.S. PATENT DOCUMENTS

| | | | | |
|---|---|---|---|---|
| 5,185,696 | A | 2/1993 | Yoshino et al. | 705/36 R |
| 5,245,535 | A | 9/1993 | Weiss et al. | 705/36 R |
| 5,262,942 | A | 11/1993 | Earle | 705/37 |
| 5,270,922 | A * | 12/1993 | Higgins | 705/37 |
| 5,276,617 | A | 1/1994 | Hiroya et al. | 701/24 |
| 5,375,055 | A | 12/1994 | Togher et al. | 705/37 |
| 5,611,052 | A | 3/1997 | Dykstra et al. | 705/38 |
| 5,689,651 | A | 11/1997 | Lozman | 705/37 |
| 5,704,045 | A | 12/1997 | King et al. | 705/35 |
| 5,710,889 | A | 1/1998 | Clark et al. | 235/379 |
| 5,761,661 | A | 6/1998 | Coussens et al. | 707/9 |
| 5,765,141 | A | 6/1998 | Spector | 705/36 R |
| 5,774,880 | A | 6/1998 | Ginsberg | 705/36 R |
| 5,784,696 | A | 7/1998 | Melnikoff | 705/36 R |
| 5,809,483 | A * | 9/1998 | Broka et al. | 705/37 |
| 5,812,988 | A | 9/1998 | Sandretto | 705/36 R |
| 5,819,236 | A | 10/1998 | Josephson | 705/35 |
| 5,835,603 | A | 11/1998 | Coutts et al. | 705/70 |
| 5,842,178 | A | 11/1998 | Giovannoli | 705/26 |
| 5,857,176 | A | 1/1999 | Ginsberg | 705/36 R |
| 5,884,287 | A | 3/1999 | Edesess | 705/36 R |
| 5,893,079 | A | 4/1999 | Cwenar | 705/36 R |
| 5,913,202 | A | 6/1999 | Motoyama | 705/36 R |
| 5,915,209 | A | 6/1999 | Lawrence | 340/3.7 |
| 5,915,246 | A | 6/1999 | Patterson et al. | 705/43 |
| 5,918,217 | A | 6/1999 | Maggioncalda et al. | 705/36 R |
| 5,918,218 | A | 6/1999 | Harris et al. | 705/37 |
| 5,933,816 | A | 8/1999 | Zeanah et al. | 705/35 |
| 5,946,666 | A | 8/1999 | Nevo et al. | 705/36 R |
| 5,946,667 | A | 8/1999 | Tull, Jr. et al. | 705/36 R |
| 5,953,721 | A | 9/1999 | Doi et al. | 707/100 |
| 5,963,922 | A | 10/1999 | Helmering | 705/35 |
| 5,978,778 | A | 11/1999 | O'Shaughnessy | 705/36 R |
| 5,983,203 | A | 11/1999 | Church et al. | 705/35 |
| 5,987,432 | A | 11/1999 | Zusman et al. | 705/35 |
| 5,987,433 | A | 11/1999 | Crapo | 705/36 R |
| 5,987,434 | A | 11/1999 | Libman | 705/36 R |
| 5,991,743 | A | 11/1999 | Irving et al. | 705/36 R |
| 5,991,744 | A | 11/1999 | DiCresce | 705/36 R |
| 5,999,918 | A | 12/1999 | Williams et al. | 705/36 R |
| 6,012,042 | A | 1/2000 | Black et al. | 705/36 R |
| 6,012,043 | A | 1/2000 | Albright et al. | 705/36 R |
| 6,012,044 | A | 1/2000 | Maggioncalda et al. | 705/36 R |
| 6,014,627 | A | 1/2000 | Togher et al. | 705/1 |
| 6,014,643 | A | 1/2000 | Minton | 705/36 R |
| 6,026,381 | A | 2/2000 | Barton, III et al. | 705/36 R |
| 6,026,382 | A | 2/2000 | Kalthoff | 705/35 |
| 6,029,146 | A | 2/2000 | Hawkins et al. | 705/35 |
| 6,038,550 | A | 3/2000 | Rosenwald | 705/35 |
| 6,049,783 | A | 4/2000 | Segal et al. | 705/37 |
| 6,052,673 | A | 4/2000 | Leon et al. | 705/38 |
| 6,055,517 | A | 4/2000 | Friend et al. | 705/36 R |
| 6,061,661 | A | 5/2000 | Hagan | 705/36 R |
| 6,064,984 | A | 5/2000 | Ferguson et al. | 705/36 R |
| 6,064,985 | A | 5/2000 | Anderson | 705/36 R |
| 6,073,115 | A | 6/2000 | Marshall | 705/35 |
| 6,078,903 | A | 6/2000 | Kealhofer | 705/36 R |
| 6,078,904 | A | 6/2000 | Rebane | 705/36 R |
| 6,078,905 | A | 6/2000 | Pich-LeWinter | 705/36 R |
| 6,085,174 | A | 7/2000 | Edelman | 705/36 R |
| 6,092,056 | A | 7/2000 | Tull, Jr. et al. | 705/36 R |
| 6,105,005 | A | 8/2000 | Fuhrer | 705/35 |
| 6,112,190 | A | 8/2000 | Fletcher et al. | 705/36 R |
| 6,119,103 | A | 9/2000 | Basch et al. | 705/35 |
| 6,125,355 | A | 9/2000 | Bekaert et al. | 705/36 R |
| 6,128,602 | A | 10/2000 | Northington et al. | 705/35 |
| 6,161,098 | A | 12/2000 | Wallman | 705/36 T |
| 6,161,099 | A | 12/2000 | Harrington et al. | 705/36 R |
| 6,188,992 | B1 | 2/2001 | French | 705/36 R |
| 6,195,647 | B1 | 2/2001 | Martyn et al. | 705/36 R |
| 6,233,566 | B1 | 5/2001 | Levine et al. | 705/36 R |
| 6,236,977 | B1 | 5/2001 | Verba et al. | 705/10 |
| 6,246,999 | B1 | 6/2001 | Riley et al. | 705/30 |
| 6,247,000 | B1 | 6/2001 | Hawkins et al. | 705/37 |
| 6,253,192 | B1 | 6/2001 | Corlett et al. | 705/36 R |
| 6,260,025 | B1 | 7/2001 | Silverman et al. | 705/37 |
| 6,269,343 | B1 | 7/2001 | Pallakoff | 705/26 |
| 6,272,528 | B1 | 8/2001 | Cullen et al. | 705/36 R |
| 6,275,814 | B1 | 8/2001 | Giansante et al. | 705/36 R |
| 6,278,982 | B1 | 8/2001 | Korhammer et al. | 705/36 R |
| 6,285,989 | B1 | 9/2001 | Shoham | 705/37 |
| 6,292,787 | B1 | 9/2001 | Scott et al. | 705/36 R |
| 6,298,334 | B1 | 10/2001 | Burfield et al. | 705/36 R |
| 6,313,833 | B1 | 11/2001 | Knight | 705/36 R |
| 6,317,727 | B1 | 11/2001 | May | 705/36 R |
| 6,321,212 | B1 | 11/2001 | Lange | 705/36 R |
| 6,330,546 | B1 | 12/2001 | Gopinathan et al. | 705/35 |
| 6,332,134 | B1 | 12/2001 | Foster | 705/36 R |
| 7,006,992 | B1 * | 2/2006 | Packwood | 705/38 |
| 7,103,556 | B2 * | 9/2006 | Del Rey et al. | 705/36 R |
| 7,113,190 | B2 * | 9/2006 | Heaton | 345/440 |
| 7,308,428 | B1 * | 12/2007 | Federspiel et al. | 705/36 R |
| 2002/0055899 | A1 * | 5/2002 | Williams | 705/37 |
| 2005/0251475 | A1 * | 11/2005 | Sato | 705/39 |

OTHER PUBLICATIONS

4—Tufte, Edward, "The Visual Display of Quantitative Information", Graphics Press, Cheshire, Connecticut, 1983.
5—Altman, E.I., Measuring Corporate Bond Mortality and Performance, *Journal of Finance*, vol. XLIV, No. 4, Sep. 1989, pp. 909-922.
6—Altman, E.I. and A. Saunders, "Credit Risk Measurement: Developments Over the Last 20 Years", *Journal of Banking & Finance*, vol. 21, No. 11, 1998, pp. 1721-1742.
7—Altman, E.I., D. Cooke and V. Kishore, "Defaults and Returns on High Yield Bonds: Analysis through 1998 and Defaults Outlook for 1999-2001", *New York University Salomon Center Special Report*, Jan. 1999, updated in Jan. 2000, 46 pages.
8—Basle Committee on Banking Supervision, "Credit Risk Modeling: Current Practices and Applications", Basle, Apr. 1999, 65 pages.
9—Basel Committee on Banking Supervision, "A New Capital Adequacy Framework", Basel, Jun. 1999, 62 pages.
10—Basel Committee on Banking Supervision, Range of Practice in Banks' Internal Ratings Systems, Basel, Jan. 2000, 46 pages.
11—Blume, M., et al., "The Declining Credit Quality of U.S. Corporate Debt: Myth or Reality?", *The Journal of Finance*, vol. LIII, No. 4, Aug. 1996, pp. 1389-1413.
12—Carey, M., "Credit Risk in Private Debt Portfolios", *The Journal of Finance*, vol. LIII, No. 4, Aug. 1998, pp. 1363-1387.
13—Caouette, J.B., E.I. Altman and P. Narayanan, *Managing Credit Risk: The Next Great Financial Challenge*, John Wiley & Sons, New York, 1998.
14—*CreditMetrics*, J. P. Morgan, New York, Apr. 2, 1997, 212 pages.
15—Credit Suisse Financial Products, "*Credit Risk+: A Credit Risk Measurement Framework*", London, 1997, 72 pages.
16—Jonsson, J.G. and M. Fridson, "Forecasting Default Rates on High Yield Bonds", *The Journal of Fixed Income*, Jun. 1996, pp. 69-77.
18—Moody's Investors Services, "Predicting Default Rates: A Forecasting Model for Moody's Issuer-Based Default Rates", *Special Comment*, Global Credit Research, Aug. 1999, 20 pages.
19—Moody's Investors Services, "Default & Recovery Rates of Corporate Bond Issuers", *Special Comment*, Global Credit Research, Feb. 2002, 52 pages.
20—Saunders, A., "*Credit Risk Measurement, New Approaches to Value at Risk and Other Paradigms*", John Wiley & Sons, New York, 1999.
23—Treacy, William F., et al., "Credit Risk Rating at Large U.S. Banks", Federal Reserve Bulletin, Nov. 1998, and *Journal of Banking & Finance*, vol. 24, 2000, No. 24, pp. 167-201.
24—"eCommerce in the Fixed-Income Markets: The 2002 Review of Electronic Transaction Systems", The Bond Market Association, Nov. 2002, 65 pages.
25—Standard and Poor's, Default, Transition, and Recovery: 2007 Annual Global Corporate Default Study and Rating Transitions, Feb. 5, 2008, 19 pages.

* cited by examiner

| Code | Color/Number | Definition | Moodys | S & P | Fitch |
|---|---|---|---|---|---|
| | | Investment Grade | | | |
| DG | 10.0 | US Treasuries | *** | *** | *** |
| DG | 9.5 | Prime, maximum safety | Aaa | AAA | AAA |
| MDG | 9.0 | Very high grade and quality | Aa1 | AA+ | AA+ |
| MDG | 8.5 | " | Aa2 | AA | AA |
| MDG | 8.0 | " | Aa3 | AA- | AA- |
| MLG | 7.5 | Upper medium quality | A1 | A+ | A+ |
| MLG | 7.0 | " | A2 | A | A |
| MLG | 6.5 | " | A3 | A- | A- |
| LG | 6.0 | Lower medium grade | Baa1 | BBB+ | BBB+ |
| LG | 5.5 | " | Baa2 | BBB | BBB |
| LG | 5.0 | " | Baa3 | BBB- | BBB- |
| | | Speculative grade | | | |
| LY | 4.5 | Speculative | Ba1 | BB+ | BB+ |
| LY | 4.0 | " | Ba2 | BB | BB |
| LY | 3.5 | " | Ba3 | BB- | BB- |
| DY | 3.0 | Highly speculative | B1 | B+ | B+ |
| DY | 2.5 | " | B2 | B | B |
| DY | 2.0 | " | B3 | B- | B- |
| LO | 1.5 | Substantial risk | | CCC+ | |
| LO | 1.0 | In poor standing | Caa | CCC | CCC |
| LO | 0.5 | " | | CCC- | |
| DR | 0.0 | Extremely speculative maybe in default | Ca | CC | CC |
| DR | 0.0 | May default | C | C | C |
| DR | 0.0 | Default | | D | DDD |
| DR | 0.0 | " | | | DD |
| DR | 0.0 | " | | | D |

FIG. 4 (c)

| Issuer and year | Rating | Quality / Color |
|---|---|---|
| Xerox 11 | Ba1/BBB- | 4.75 / LY |
| Delta Air 11 | Baa3/BBB- | 5.00 / LG |
| CSX Corp 11 | Baa2/BBB | 5.50 / LG |
| Duke Energy 11 | Baa2/BBB | 5.50 / LG |
| AOL Time Warner 11 | Baa1/BBB+ | 6.00 / LG |

FIG. 5(b)

| Issuer and year | YTM % | Quality | Color code | CY % |
|---|---|---|---|---|
| Xerox 11 | 12.71 | 4.75 | LY | 14.05 |
| Delta Air 11 | 8.79 | 5.00 | LG | 8.91 |
| CSX Corp 11 | 6.75 | 5.50 | LG | 7.17 |
| Duke Energy 11 | 6.96 | 5.50 | LG | 7.43 |
| AOL Time Warner 11 | 6.66 | 6.00 | LG | 6.94 |
| Sprint 11 | 7.54 | 6.00 | LG | 7.73 |
| Hertz Corp 11 | 6.89 | 6.50 | MLG | 7.21 |
| Sears Roebuck 11A | 7.00 | 6.50 | MLG | 7.12 |
| Sears Roebuck 11B | 7.26 | 6.50 | MLG | 7.43 |
| Key Bank 11 | 6.74 | 7.00 | MLG | 6.91 |
| Ford Motor 11 | 6.81 | 7.00 | MLG | 6.97 |
| General Motors 11 | 6.89 | 7.00 | MLG | 7.04 |
| Dow Chemical 11 | 6.16 | 7.25 | MLG | 6.37 |
| United Tech 11 | 6.19 | 7.25 | MLG | 6.34 |
| National City Bank 11 | 6.55 | 7.25 | MLG | 6.72 |
| Royal Bank Scotland 11 | 6.56 | 7.25 | MLG | 6.74 |
| Boeing Capital 11 | 6.29 | 7.50 | MLG | 6.44 |
| JP Morgan Chase 11 | 6.41 | 7.50 | MLG | 6.59 |
| Bank of America 11 | 6.65 | 7.50 | MLG | 6.84 |
| SBC Comm. 11 | 6.37 | 8.00 | MDG | 6.51 |
| New York Tel 11 | 7.38 | 8.00 | MDG | 7.51 |
| Citigroup 11 | 6.36 | 8.25 | MDG | 6.48 |
| US Treasuries 11 | 5.17 | 10.00 | DG | 4.78 |

| Issuer | Coupon % | Quality | Code | # of bonds |
|---|---|---|---|---|
| Lincoln National 05 | 6.50 | 6.5 | MLG | 3 |
| Hilton Hotels 06 | 7.63 | 5.0 | LG | 3 |
| SunTrust Bank 07 | 6.25 | 7.5 | MLG | 3 |
| Philip Morris 08 | 7.65 | 6.8 | MLG | 3 |
| US West 09 | 6.38 | 6.0 | LG | 3 |
| Motorola 10 | 5.80 | 7.0 | MLG | 3 |
| Chancellor Media 11 | 8.00 | 4.8 | LY | 3 |
| Sprint 12 | 6.13 | 6.0 | LG | 3 |
| National Rural 13 | 5.75 | 7.5 | MLG | 3 |
| Wachovia Corp 14 | 5.63 | 7.0 | MLG | 3 |
| Coastal Corp 14 | 9.63 | 5.5 | LG | 3 |
| Archer Daniels 14 | 8.13 | 7.5 | MLG | 3 |
| Citicorp 15 | 7.38 | 7.5 | MLG | 3 |
| Comcast 16 | 10.63 | 4.5 | LY | 3 |
| Westinghouse 17 | 8.63 | 6.5 | MLG | 3 |
| Fleet Financial 18 | 7.05 | 6.5 | MLG | 3 |
| NM Bankers 19 | 7.00 | 7.3 | MLG | 3 |
| Fleet Financial 20 | 6.83 | 6.5 | MLG | 3 |
| Ashland Oil 21 | 8.80 | 5.5 | LG | 3 |
| Bankers Trust 22 | 7.00 | 7.3 | MLG | 3 |
| El Paso Energy 23 | 7.38 | 5.5 | LG | 3 |
| *Porfolio average* | 7.33 | 6.4 | LG | |
| *Total bonds* | | | | 63 |

| Year | LY | LG | MLG | Annual |
|------|-----|-----|-----|--------|
|      | 4.5 | 6   | 7.5 | interest |
| 2002 | $319 | $1,618 | $2,690 | $4,627 |
| 2003 | $319 | $1,618 | $2,690 | $4,627 |
| 2004 | $319 | $1,618 | $2,690 | $4,627 |
| 2005 | $319 | $1,618 | $2,690 | $4,627 |
| 2006 | $319 | $1,618 | $2,495 | $4,432 |
| 2007 | $319 | $1,389 | $2,495 | $4,203 |
| 2008 | $319 | $1,389 | $2,307 | $4,015 |
| 2009 | $319 | $1,389 | $174 | $1,882 |
| 2010 | $319 | $1,198 | $1,903 | $3,420 |
| 2011 | $319 | $1,198 | $1,903 | $3,420 |
| 2012 | $319 | $958 | $1,903 | $3,180 |
| 2013 | $319 | $774 | $1,903 | $2,996 |
| 2014 | $319 | $774 | $1,730 | $2,823 |
| 2015 | $319 | $485 | $1,317 | $2,121 |
| 2016 | $319 | $485 | $1,096 | $1,900 |
| 2017 |      | $485 | $1,096 | $1,581 |
| 2018 |      | $485 | $837 | $1,322 |
| 2019 |      | $485 | $625 | $1,110 |
| 2020 |      | $485 | $415 | $900 |
| 2021 |      | $485 | $210 | $695 |
| 2022 |      | $221 | $210 | $431 |
| 2023 |      | $221 |      | $221 |
| Total | $4,785 | $20,996 | $33,379 | $59,160 |

FIG. 5(i)

FIXED INCOME SECURITIES RATINGS VISUALIZATION

CROSS-REFERENCE TO RELATED APPLICATIONS

This application is a continuation-in-part of U.S. patent application Ser. No. 10/303,102, entitled "Fixed Income Securities Ratings Visualization," filed Nov. 25, 2002, which issued as U.S. Pat. No. 7,827,080 on Nov. 2, 2010, and which claims the benefit of U.S. Provisional Patent Application Ser. No. 60/356,472, entitled "System and Method for the Visualization of the Relative Value of Rated Debt," filed Feb. 14, 2002, the contents of which are hereby incorporated by reference in their entirety.

BACKGROUND

The financial investment industry has been transformed by developments of communication and computer technologies. Low cost personal computers and the Internet have allowed individual investors to gain access to financial information as well as trading and investment technology. The advent of self-directed retirement savings accounts has increased the need for market data and for tools to aid investors in their decision-making. In the equity and mutual fund markets, various platforms and tools sets have been developed and made easily available to individual investors via computer systems and the Internet.

The fixed income market has traditionally been an institutional market that serves, for example, pension funds, insurance companies and banks. The fixed income market lacks price transparency and liquidity. Trades executed in the fixed income market are often done in very large quantities. There are very few ways for individual investors to gain access to bonds offered for sale and practically no tools available to evaluate the offerings beyond rudimentary yield calculators. In addition, market information is fragmentary and often unavailable to retail investors.

The fixed income market is generally segmented into the Treasury, corporate bond, municipal bond, mortgage-backed security, federal agency and asset backed securities. The Treasury market, which comprises the debt of the United States government, has historically provided the most actively traded and widely owned fixed income securities. It is widely believed that this debt will never default and is considered the "gold standard" for safety. Therefore, the risk of owning other types of debt is usually measured against the safety of owning Treasury debt.

Almost all fixed income securities, other than Treasury debt, are rated by rating agencies that are quasi-regulatory groups that evaluate the creditworthiness of firms that issue debt securities. The rating agencies are designated "Nationally Recognized Statistical Rating Organizations" by the United States Securities and Exchange Commission and play an important role in the financial markets.

A retail investor seeking to evaluate fixed income securities offered for sale is typically presented with tables of symbolic or alphanumeric rating data. Each of such symbolic ratings may correspond to an evaluation of a security from a particular rating agency and may have well defined semantic meanings in terms of the creditworthiness of the security. In addition, since there may be more than one such rating agency, each of such rating agencies may have its own rating scheme with a different symbolic rating scale. When a retail investor receives such rating information, it is very difficult to review the offerings and understand the relative risk of one security versus another. The difficulty is related to both the fact that each fixed income security may be associated with various credit ratings issued by different rating agencies and the retail investor's ability to weigh the risk and return based on such information. It becomes even more difficult when a retail investor attempts to evaluate the risk and return of a portfolio of rated debt. In the current market, there are no available systems or tools that facilitate retail investors in examining market information and in making fixed income market investment decisions. This shopping difficulty prevents many retail investors from participating in the fixed income market.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
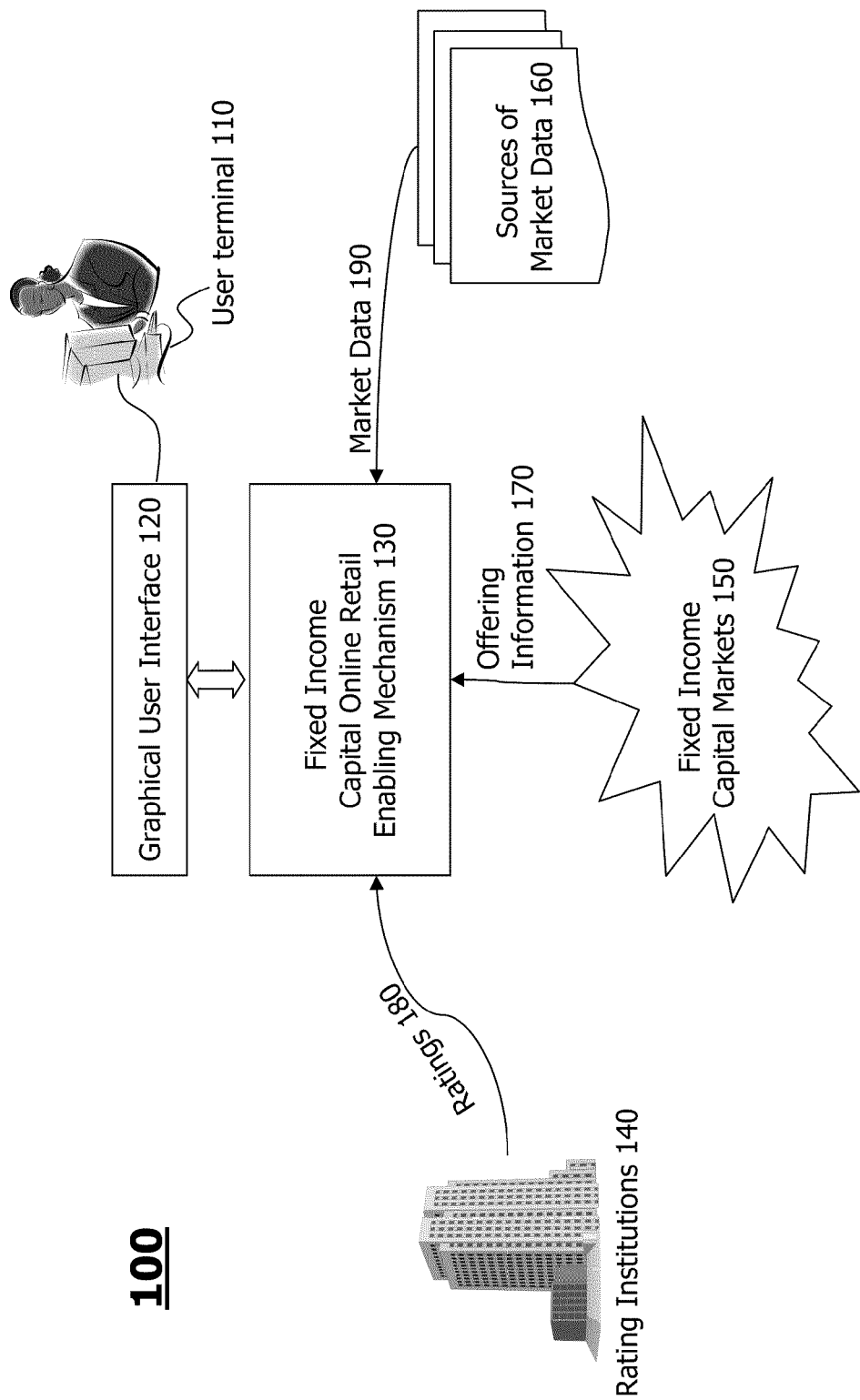
FIG. 1 depicts the overall architecture for a fixed income online retail enabling mechanism, according to the embodiments of the present invention.

FIG. 1 depicts the overall architecture 100 for online retail of fixed income securities, according to embodiments of the present invention. The architecture 100 includes a user terminal 110, a graphical user interface 120, and a fixed income online retail enabling mechanism 130. The user terminal 110 may be operated by an individual retail investor or an investor representative acting on behalf of an individual customer investor. The user, via terminal 110, trades, via the fixed income online retail enabling mechanism 130, securities in one or more fixed income capital markets 150 based on information related to such securities such as offering information 170, the ratings 180 with respect to the securities in the fixed income capital markets 150 obtained from rating institutions 140, as well as other market data 190 from other sources of market data 160.

The fixed income online retail enabling mechanism 130 provides the means to facilitate online trading of securities in fixed income markets. This may include, but is not limited to, means to visualize information from different sources so that a user can effectively evaluate a specific security or conditions within the market against their portfolios from a multiple perspectives. To do so, the fixed income online retail enabling mechanism 130 may also facilitate different peripheral functionalities to enable various business processes related to online fixed income bond trading. For instance, the fixed income online retail enabling mechanism 130 may offer the means to manage portfolios associated with different accounts, including dynamic update of a portfolio whenever a corresponding user trades fixed income securities or the rating on a specific fixed income security is changed.

Figure 2:
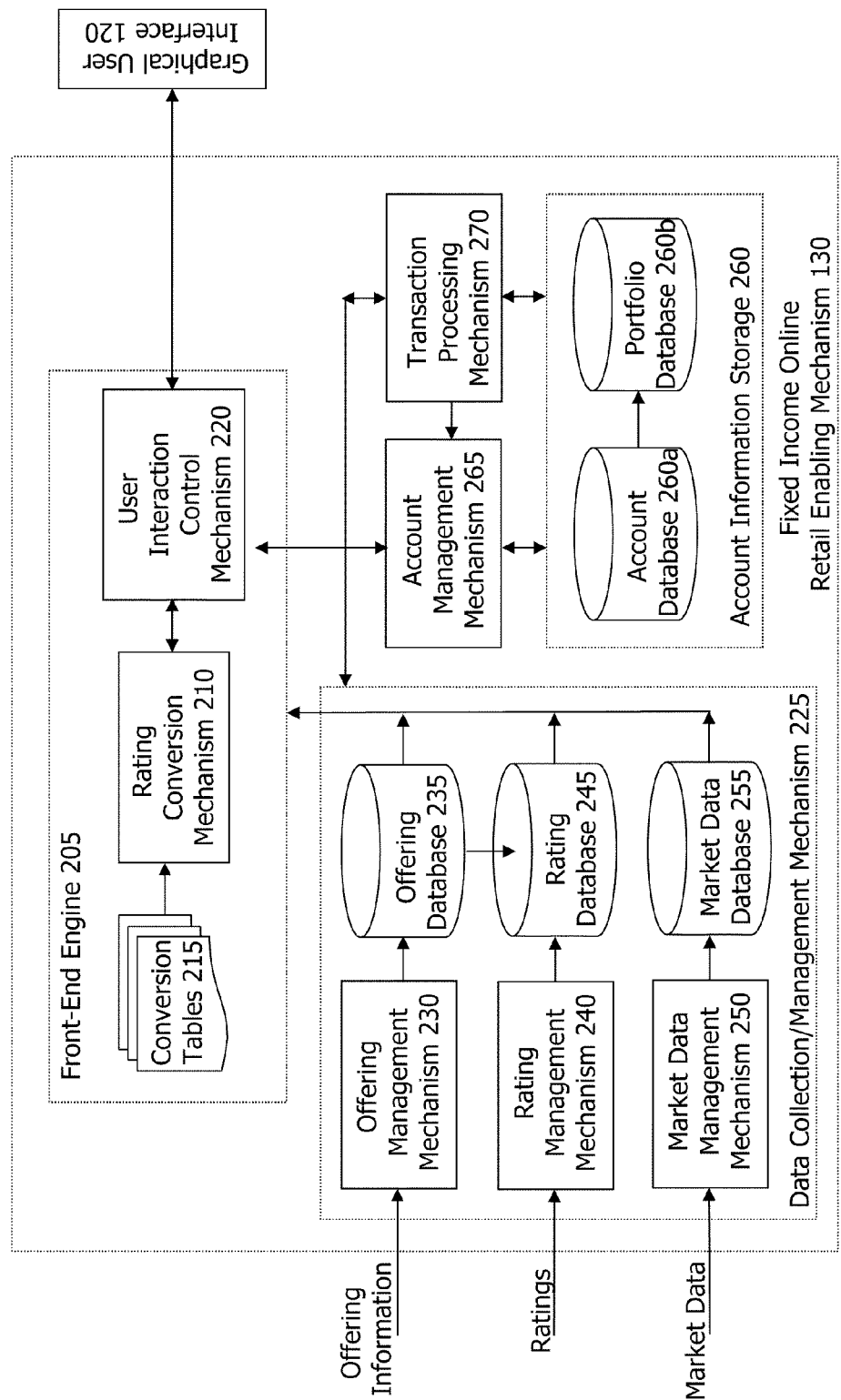
FIG. 2 depicts an exemplary internal high level functional block diagram of a fixed income online retail enabling mechanism.

FIG. 2 depicts an exemplary internal high-level functional block diagram of the fixed income online retail enabling mechanism 130. The fixed income online retail enabling mechanism 130 may comprise a front-end engine 205, a data collection and management mechanism 225, an account management mechanism 265, and a transaction processing mechanism 270. The front-end engine 205 interfaces with the graphical user interface 120 to facilitate the interaction between the user operating through the user terminal 110 and the fixed income online retail enabling mechanism 130.

The data collection and management mechanism 225 is responsible for collecting relevant data from different sources and such information is used for visualizing different aspects of the market and for helping a user to evaluate the fixed income capital markets. The types of information to be collected for such purposes may include, but not limited to, offering information describing daily offerings of different securities in the fixed income markets, ratings of such offerings issued by one or more authorized rating institutions (140), and other market data related to the securities such as pricing, news, or commentaries related to different securities in the fixed income markets.

To make information from different sources readily available for use in enabling online trading of fixed income securities, the data collection and management mechanism may comprise an offering management mechanism 230, a rating management mechanism 240, and a market data management mechanism 250. Each may have an associated database deployed to organize the collected data. For instance, the offering management mechanism 230 may be associated with an offering database 235 used for storage, organization, and retrieval of information related to bond offerings. The rating management mechanism 240 may be associated with a rating database 245 that is used for the storage and retrieval of rating information. Similarly, the market data management mechanism 250 may be associated with a market data database 255 where different types of market data are stored, organized, and accessed when needed.

Each of the management mechanisms (the offering mechanism 230, the rating management mechanism 240, and the market data management mechanism 250) may be capable of performing a plurality of functionalities related to managing the corresponding types of information. That is, each may have its own data collection capabilities (i.e., communicate with outside servers to request relevant information), data organizational capabilities (e.g., sorting data according to some specified criteria), data indexing capabilities (e.g., to build efficient indexing scheme), and data retrieval capabilities (e.g., efficiently retrieve requested data based on pre-established indexing system). For example, these management mechanisms may be capable of contacting relevant agencies to request information. The offering management mechanism 230 is capable of contacting authorized institutions to gather offering information. The rating management mechanism 240 is capable of connecting to the rating institutions to gather official rating information about different securities. Similarly, the market data management mechanism 250 may connect to a set of different sources to gather commentaries and pricing about certain securities. Details related to the offering mechanism 230 and the rating management mechanism 240 are discussed with reference to FIG. 7 and FIG. 8.

The ratings collected from the rating institutions 140 may be in some standard symbolic representations. Each rating may be given with respect to a particular bond identifiable using some identification scheme. For instance, each of the securities can be identified according to a unique identification such as the Uniform Security Identification Procedures (CUSIP) adopted by The American Bankers Association's Committee. There may be different sources of ratings with respect to a single bond such as Moody's rating, Standard and Poor's (S&P) rating, and Fitch's rating. Different rating institutions may adopt different symbolic rating schemes. For instance, rating "AA+" from S&P may correspond to rating "Aa1" (a different rating symbol) from Moody's. In addition, ratings issued from different rating institutions with respect to a single bond may differ. For instance, for bond X, Moody's may have a rating of "Aaa" (corresponding to rating "AAA" of S&P) but S&P may give a different rating "AA+" (corresponding to rating "Aa1" of Moody's which is a lower rating than "Aaa") with regard to the credit quality of the same bond.

Each of the rating scales adopted may be associated with a particular semantic meaning. Semantic interpretations associated with different ratings may be pre-determined. For example, rating "Aaa" may mean "Best quality" and rating "Aa2" may mean "High quality."

The ratings obtained from rating institutions are used to help a user to evaluate the securities in the fixed income markets. To make the evaluation more effective and efficient, the front-end engine 205 provides a rating conversion mechanism 210 to convert the symbolic ratings from the rating institutions 140 into easier to understand and visually appealing representations. Such representations may include, but are not limited to, color representation or numerical representation. The rating conversion mechanism 210 takes a symbolic rating (such as "AAA") as input and generates either a color code (such as green) or a real value (such as 9.5) to describe the meaning of the symbolic rating. Details of the rating conversion mechanism 210 are discussed with reference to FIG. 3.

In converting a symbolic rating into a color code or a real value, the rating conversion mechanism 210 may employ different schemes to complete the conversion. For example, a scheme of table look up may be adopted. In this case, one or more conversion tables 215 are pre-constructed that allows conversion to be achieved via a simple online look-up operation. Exemplary constructs of conversion tables are described with reference to FIGS. 4(a) and 4(b). There may be other alternative conversion schemes such as automatic conversion via a pre-defined formula (not shown in FIG. 2). For instance, a formula may be defined as a mapping from a symbolic rating to a color code. That is, a symbolic rating may be taken as a parameter of the formula.

To achieve conversion using a pre-defined formula, a symbolic rating may be first transformed into a numeric value. The numeric value may then be plugged in the pre-defined formula to produce one or more output values corresponding to a color code. For example, if (R, G, B) scheme is adopted to represent color, the resulting values from the pre-defined formula corresponding to the value of R (red), G (green), and B (blue). On the other hand, a different color representation may be adopted such as (G, Y, R) (corresponding to green, yellow, and red).

A symbolic rating may also be converted into a real value defined in a pre-specified range. For example, a converted rating may correspond to a real value within the range of [0, 10], where a converted real value of 10 may be specified as a perfect rating (highest possible) and a converted real value of 7.5 may correspond to a rating that is of a less than perfect quality.

The rating conversion mechanism 210 takes a symbolic rating (collected by, for example, the rating management mechanism 240) from a particular rating institution (e.g., S&P) and produces one or more rating representations (e.g., color code or a real value). Such converted rating representations are then used by a user interaction control mechanism 220 to generate various visual presentations of the information related to securities in the fixed income capital markets 150 to assist a user to evaluate the securities. Details of the user interaction mechanism 220 are presented with reference to FIGS. 3, 5, 6, 12, 13, 14, and 15.

In addition to facilitate a user in analyzing information related to securities through data collection, management, conversion, and visualization, the fixed income online retail enabling mechanism 130 may also assist the user in managing corresponding account information or performing bond transactions. The account management mechanism 265 may provide various means for the user to query, add, delete, and update account information in the portfolio of each account. Details about the account management mechanism 265 are discussed with reference to FIGS. 9 and 16. Account information associated with users of the fixed income online retail enabling mechanism 130 may be stored in an account information storage 260 which may organize information related to both account (260a) as well as portfolio information (260b) associated with individual accounts in a coherent manner.

Although account and portfolio information are shown as separate entities in FIG. 2, they may be managed as coupled information. The account information storage 260 may be realized in many different arrangements. One arrangement may integrate portfolio information with each account and manage the portfolio information as part of the account information. In an alternative arrangement, portfolio information may be managed as a separate data set with indices established using account information. In this arrangement, each database (e.g., the account database 260a or the portfolio database 260b) may be managed in a manner that is most suitable considering the nature of the data. Yet, the relationships between different databases can be effectively established based on indices. Specific arrangements for different deployments may be determined according to application needs.

The storage 260 may provide not only physical storage management capabilities but also indexing and efficient retrieving capabilities. Off-the-shelf database products such as dBase III or Oracle may be used to implement the account information storage. In this case, the account information storage 260 may interface with other mechanisms (such as the account management mechanism 265 and the transaction processing mechanism 270) via standard database protocols such as standard query language (SQL). Through such a standard interface, an outside mechanism such as the account management mechanism 265 may perform various database operations. For example, using SQL, the account management mechanism 265 may retrieve information about an account, add an account, delete an account, or update information associated with an account (e.g., updating a portfolio after a transaction).

The transaction processing mechanism 270 facilitates a user in trading fixed income securities. When receiving an order (e.g., to buy or to sell securities) issued by the user from the user terminal 110 via the user interaction control mechanism 220, the transaction processing mechanism 270 carries out the requested transaction according to what is specified in the received order. To do so, it may, for example, conduct further processing such as checking the credit available in the account against the value of the trade and updating a corresponding portfolio when the transaction is completed. The transaction processing mechanism 270 may also interact with the account information storage 260a to, for example, retrieve cash balance information stored in an account and update the portfolio of the account. Details related to the transaction processing mechanism 270 are described with reference to FIGS. 10 and 17.

Figure 3:
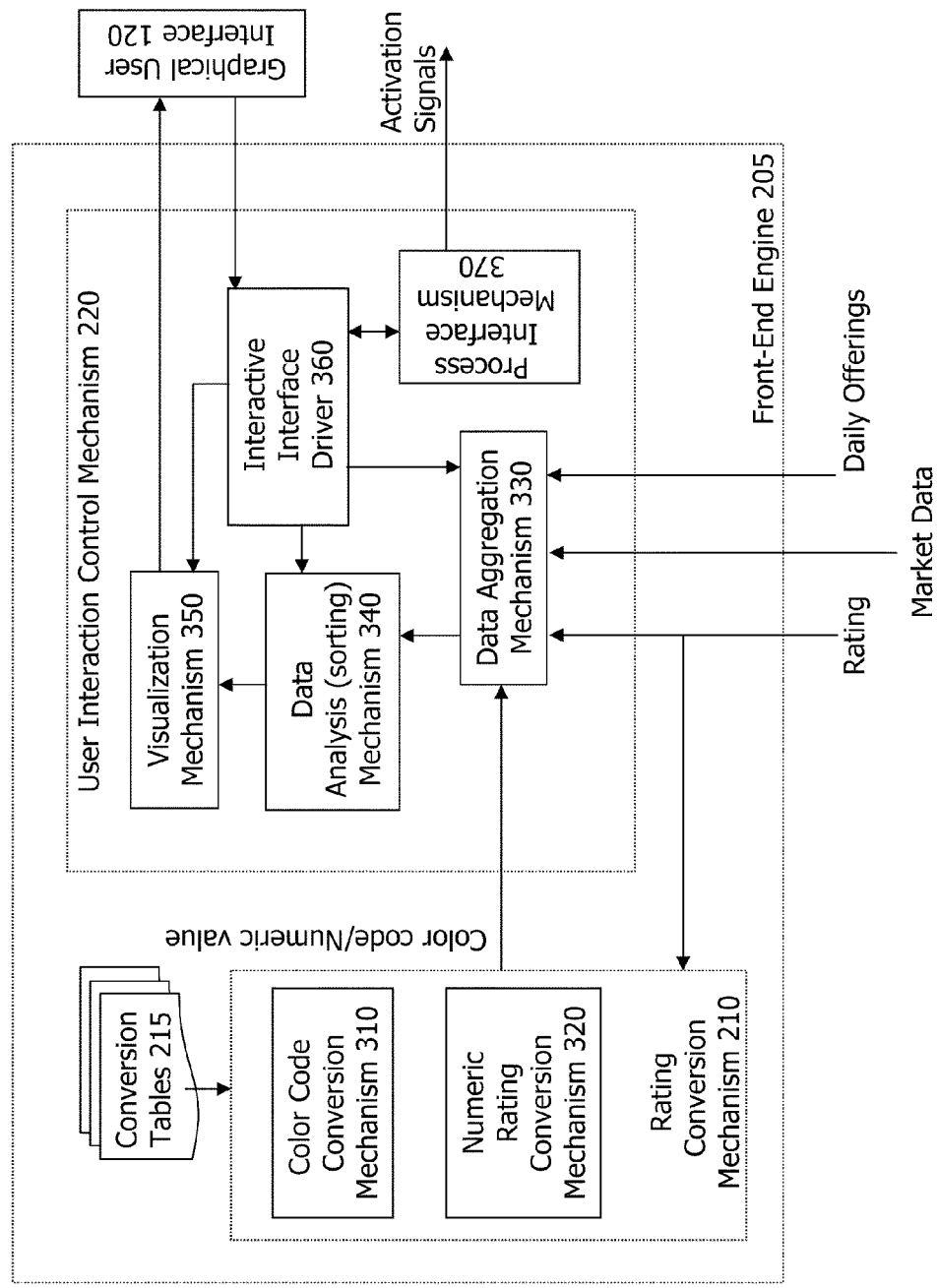
FIG. 3 depicts an exemplary internal high level functional block diagram of a front-end engine that facilitates visual interactions between an online fixed income user and a fixed income online retail enabling mechanism.

FIG. 3 depicts an exemplary internal high level functional block diagram of the user interaction control mechanism 220 of the front-end engine 205 (in relation to the rating conversion mechanism 210) that facilitates visual interactions between an online fixed income bond trading user and the fixed income online retail enabling mechanism 130. The user interaction control mechanism 220 directs the fixed income online retail enabling mechanism 130 to perform appropriate acts according to the requests of the user specified via the graphical user interface 120. The user interaction control mechanism 220 comprises an interactive interface driver 360, a process interface mechanism 370, a data aggregation mechanism 330, a data analysis mechanism 340, and a visualization mechanism 350.

The interactive interface driver 360 forwards requests from a user issued through the user terminal 110 first to the process interface mechanism 370 so that the process interface mechanism 370 can activate appropriate parts of the fixed income online retail enabling mechanism 130 to react to the user's requests. Details of the internal structure of the process interface mechanism 370 to achieve described function are described with reference to FIG. 6. The interactive interface driver 360 may also forward user request related information to the data aggregation mechanism 330, the data analysis mechanism 340, and the visualization mechanism 350. For instance, the user may specify what kind of information (e.g., ratings) is desired with respect to certain securities. In this case, the interactive interface driver 360 may first send the relevant data to the process interface mechanism 370 so that it can direct appropriate mechanisms to collect desired information. The interactive interface driver 360 may also inform the data aggregation mechanism 330 in terms of what types of data to be aggregated. In addition, it may inform the data analysis mechanism 340 to sort the data according to the alphabetic order of the issuing corporations with original ratings displayed in an order of, for instance, "Moody's," "S&P," and "Fitch."

The data aggregation mechanism 330 takes different data inputs and aggregates data to generate consolidated data. For example, it may take daily offering data from the offering management mechanism 230, market data from the market data management mechanism 250, and the symbolic ratings corresponding to the daily offerings as well as their converted ratings (e.g., in color codes and in real values) as input and generate a table of data in which each row corresponds to one offering and each column corresponds, for instance, either a converted rating or market data. In addition, the data aggregation mechanism 330 may also take some proprietary data as input and use it together with the information from other sources. For instance, such proprietary data may be generated internally by other parts of the fixed income online retail enabling mechanism 130 or may be information from other business partners.

Such proprietary data may be generated based on information originally offered as public data yet analyzed using some proprietary methodologies or algorithms. Business partnerships or licenses may also allow one party to provide such proprietary data to other parties so that the business partners may share information. For instance, a market data firm may form a business partnership that allows them to share data, which relates to historical pricing for fixed income securities. Under this partnership, the data with regard to a particular security is analyzed and processed using in-house developed models to analyze such gathered data and generate a prediction of the performance of a security. This prediction could be derived from the historical return on fixed income securities that have, for example, credit quality of 7.5 and are securities from issuing corporations in the telecommunications sector.

The data aggregation mechanism 330 may also perform aggregation based on instructions received from the interactive interface driver 360 that may generate such instructions based on the input from the user received via the graphical user interface 120. For example, if the user indicates, via the graphical user interface 120, that only ratings are to be reviewed (without other market data), the interactive interface driver 360 then instructs the process interface mechanism 370 to activate accordingly appropriate data collection mechanisms (discussed with reference to FIG. 6) to gather desired information. The desired information is then, after being collected, sent to the data aggregation mechanism 330 to prepare for visual presentation.

The aggregated data generated by the data aggregation mechanism 330 may be fed to the data analysis mechanism 340 where data may be further processed for visual presentation purposes. For example, when a list of daily offerings is gathered with converted ratings, the offerings may be sorted, in an alphabetic order, according to the names of the issuing corporations. The processed data is then sent to the visualization mechanism 350 so that a visual presentation of the processed aggregated data can be constructed. The form of the visual presentation to be generated may be determined according to what the user desires. The visualization mechanism 350 generates appropriate visual presentations on the graphical user interface according to what the user desires (informed via the interactive interface driver 360).

As described earlier, the converted ratings can be color code or real values. In FIG. 3, the rating conversion mechanism 210 includes, but is not limited to, a color code conversion mechanism 310 and a numeric code conversion mechanism 320. The former converts a symbolic rating to a color code and the latter converts a symbolic rating to a real value with a pre-specified range. The rating conversion mechanism 210 may perform the conversion based on one or more conversion tables that may be pre-constructed to facilitate real-time table look-up operations in converting a rating.

Figure 4:
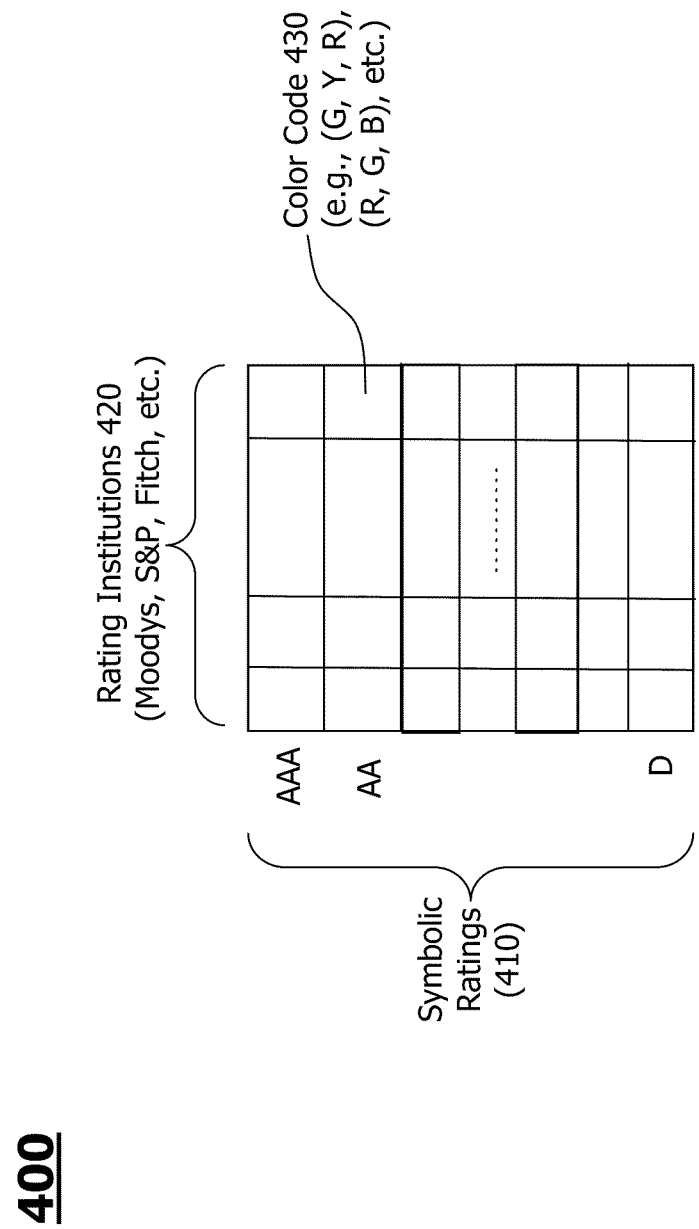
FIGS. 4(a)-(b) illustrate exemplary constructs of different conversion tables used in converting a symbolic rating to different representations.
FIG. 4(c) illustrates exemplary relationships between different symbolic ratings and converted ratings.
Figure 4:
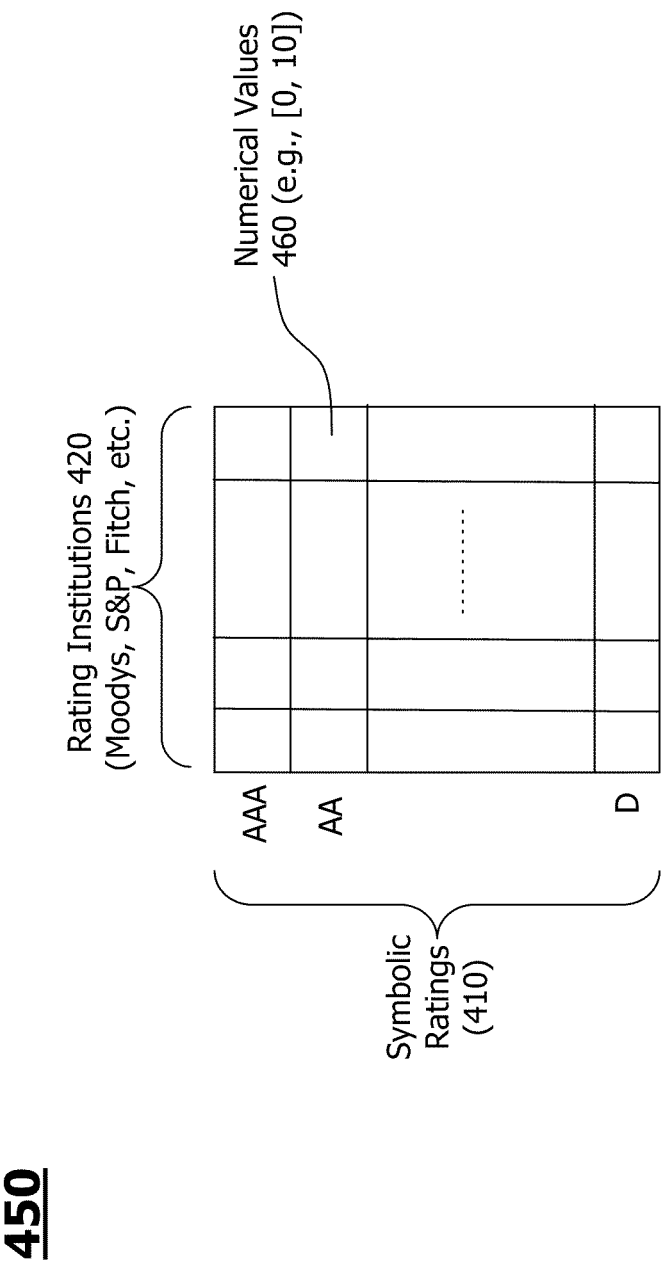

FIGS. 4(*a*)-(*b*) illustrate exemplary constructs of different conversion tables used in converting a symbolic rating to different representations. FIG. 4(*a*) shows an exemplary construct of a table 400 used in converting a symbolic rating to a color code. The table 400 may have a plurality of rows, corresponding to different symbolic ratings 410, and a plurality of columns, corresponding to different rating institutions 420. For instance, the symbolic ratings may include labels such as "AAA" or "A2." Each of the columns represents a single rating institution.

Each of the element in table 400 stores a color code represented using a particular color scheme. For instance, a color code may be represented as a tuple of (green, yellow, red) or (G, Y, R) or as a tuple of (red, green, blue) or (R, G, B). Each of the values in such a three-value tuple represents the proportion along each underlying color spectrum and blending the three portions yields a color represented by the tuple. Alternatively, rather than blending the three color code values in the three-value tuple, the three color code values may be displayed in a row create an aggregated representation. For example, a tuple having three color code values corresponding to light yellow (LY), light green (LG), and light yellow may be separately displayed in a row (i.e., LY|LG|LY).

To perform rating conversion to a color code, a real-time table look up operation may be performed based on the table 400. For example, if a rating from Moody's is "A2," the table look up operation identifies the column corresponding to the Moody's (e.g., first column in FIG. 4(a)) and the row corresponding to the symbolic rating "A2." This gives rise to an entry in the table 400 where a particular color code can be retrieved as the converted color code.

The color codes stored in the table 400 may be pre-determined according to intended visual effects of the corresponding symbolic ratings. For example, a symbolic rating "D" (stands for "default") may be assigned a color of bright red intended to have an alarming visual effect. On the other hand, a symbolic rating of "AAA" may be assigned a color of dark green indicating that the credit quality of the corresponding bond is excellent. Between these two extremes, different symbolic ratings may be assigned colors from the medium green to yellow and all the way to bright red, indicating gradual drop of credit quality of the underlying securities. Along the vertical direction of the table 400 from top to the bottom, the symbolic ratings are arranged from the best to the worst so that the arrangement yields gradual varying color zones. For example, the color codes assigned to the top row(s) may correspond to dark green and the color codes assigned to the bottom row(s) may correspond to bright red. Ratings in between the top and the bottom in top down direction may correspond to one or more rows of green (e.g., varying degree of green) to one or more rows of yellow (e.g., varying degrees of yellow), to one or more rows of red. This is illustrated in FIG. 4(a).

When there is a need to convert a combination of more than one symbolic rating into a single color code (e.g., visualizing the overall credit quality of a bond rated by a plurality of rating institutions), different alternatives may be employed to achieve the task. For example, if a bond is rated by Moody's, S&P, as well as Fitch and the corresponding ratings are X, Y, and Z. To generate a single color code based on ratings X, Y, and Z, the relationships among the symbolic ratings may be analyzed. If all the symbolic ratings are from the same credit quality category (e.g., all correspond to green color), a particular shade of green may be selected to represent the overall rating. The selection may be based on the principle of worst or best or average. The lightest color (the worst) among all may be selected to conservatively visualize the overall credit quality. The darkest color (the best) among all may be selected to optimistically visualize the overall credit quality of the bond. The middle color may also be selected to represent a medium overall quality. Yet another alternative is to average the three color codes to yield an averaged credit quality visualization. In another example, as noted above, rather than converting multiple symbolic ratings into one single color code, an aggregated representation may include different color codes corresponding to the multiple symbolic ratings displayed in a row. For example, different symbolic ratings from different rating institutions may have color codes corresponding to light yellow (LY), light green (LG), and light yellow, which may be separately visualized in a row (i.e., LY|LG|LY).

FIG. 4(b) describes an exemplary conversion table 450 used in converting a symbolic rating to a real value. The table 450 may be structured in a similar way as the table 400. The difference between the table 400 and the table 450 is the values stored in each element of the table. In general, the values stored in a table correspond to the converted ratings. For example, since the table 400 is used to convert to color codes, the values stored in individual elements of the table 400 correspond to color codes. The table 450 is constructed to assist the conversion from a symbolic rating to a real value, the values stored in individual elements of the table 450 correspond to real values.

A real value converted based on a symbolic rating may fall within a fixed range. For example, such a range can be between 0 and 10 (as shown in FIG. 4(b)). Such a range may be intended to provide the user a sense of the credit quality of a bond that is rated. One end of the range may correspond to a best quality rating and the other end of the range represents the opposite. Given a range of [0, 10], real value 10 may correspond to a best quality and 0 may correspond to a worst quality. Conversion from a symbolic rating to a real value is therefore a mapping from a range of symbols (e.g., "AAA," "A2," ..., "D") to a range of real values (e.g., 10, 9.5, ..., 0.0). The table 450 is designed to facilitate the conversion.

Similar to converting a plurality of symbolic ratings to a single color code representing a visualization of the overall credit quality based on different ratings, different strategies may be applied in converting a plurality of symbolic ratings of a single bond to a single real value representing an assessment of the overall credit quality of the bond based on ratings from multiple sources. Given multiple symbolic ratings, a plurality of real values may be identified from the table 450. One strategy is to use the minimum real value among such derived plurality of real values as a conservative overall assessment of the credit quality of the bond. Alternatively, the maximum real values may be used to optimistically evaluate the overall credit quality of the bond. Similarly to color conversion, an average of the individually converted real values may be computed to provide an averaged assessment of the overall quality of the bond.

FIG. 4(c) illustrates correspondence among color codes, real values, symbolic ratings from different sources, as well as the semantic interpretation of different ratings. Each row corresponds to a distinct converted rating equivalent to some symbolic rating (or symbolic ratings from different sources). The left column displays a color code converted from some symbolic rating(s). The color code is displayed as a block of color visualized according to the color represented by the converted color code. Due to the requirement for non-color figures in a patent application, to indicate what color each color block is, the color of the block is indicated using an abbreviation of the color. For instance, abbreviation "DG" indicates dark green, "MDG" for medium dark green, "MLG" for medium light green, "LG" for light green, "LY" for light yellow, "DY" for dark yellow, "LO" for light orange, "LO" for light orange, "R" for red, and "DR" for dark red. This abbreviation system is merely for clarification purposes and may not be used in implementation of the present invention. Any implementation of the present invention may adopt only color to effectuate the visual effect of the converted color code.

The second column displays the real value converted from the same symbolic rating(s). The third column displays the semantic meaning of the corresponding symbolic rating(s). The last three columns give the equivalent symbolic ratings from different sources. For example, an "Aaa" rating from Moody's corresponds to an "AAA" rating from both S&P and Fitch and they all have a semantic interpretation of "prime, maximum safety." In addition, an "Aa1" rating from Moody's corresponds to an "AA+" rating from the other two, "Aa2" to "AA," and "Aa3" to "AA−," all interpreted as having quality of "very high grade and quality." From top down, the quality degrades gradually and so are the color codes (from dark green to lighter and lighter green to yellow to bright red) and the real values (from value 10.0 to value 0.0).

Based on processed aggregated data (aggregated data is generated by the data aggregation mechanism 330 and may then further processed by the data analysis mechanism 340), the visualization mechanism 350 creates appropriate visual presentations on the graphical user interface 120. FIG. 5(a) depicts an exemplary internal structure of the visualization mechanism 350 that is capable of generating various visual presentations for information related to the specific characteristics of fixed income securities (i.e., coupon rate, credit rating). To support effective visualization of different aspects of information related to fixed income securities, the visualization mechanism 350 comprises a bond offering visualization mechanism 510, a life cycle visualization mechanism 520, a portfolio holdings visualization mechanism 530, an interest projection visualization mechanism 540, an income/principal projection visualization mechanism 550, and a default rate visualization constructor 560.

The visualization mechanism 350 is driven by the user's visualization choices. That is, according to the user's visualization choice, different parts of the visualization mechanism 350 may be activated to construct a selected visual presentation. Such visualization choice may be related to the operations performed by the user. For example, if the user is examining offering related information, the visualization choice may be related to visualizing the bond offerings. Similarly, if the user is performing portfolio management activities (e.g., checking the income of a corresponding portfolio), the visualization choice may be related to visualizing the income/principal projections.

The bond offering visualization mechanism 510 visualizes the bond offerings based on aggregated data. One exemplary visualization of fixed income securities is shown in FIG. 5(b) where each row corresponds to one offering. In each row, the left-most column gives the name of the corporation that issues the bond and the year that security matures, the second column provides the symbolic ratings of the bond from different sources, and the third column provides a combined assessment of the overall credit quality of the offering visualized based on a color and a real value converted from the symbolic ratings. For example, the bond in the first row (corresponding to bond issued by Xerox which matures in year 2011) has a symbolic rating of Ba1/BBB– and has a real value of 4.75 displayed on a color of light yellow (the color light yellow is indicated as LY). As shown in FIG. 5(c), an additional column may provide information related to current yield (CY %) associated with the bond in the same row.

Figure 5:
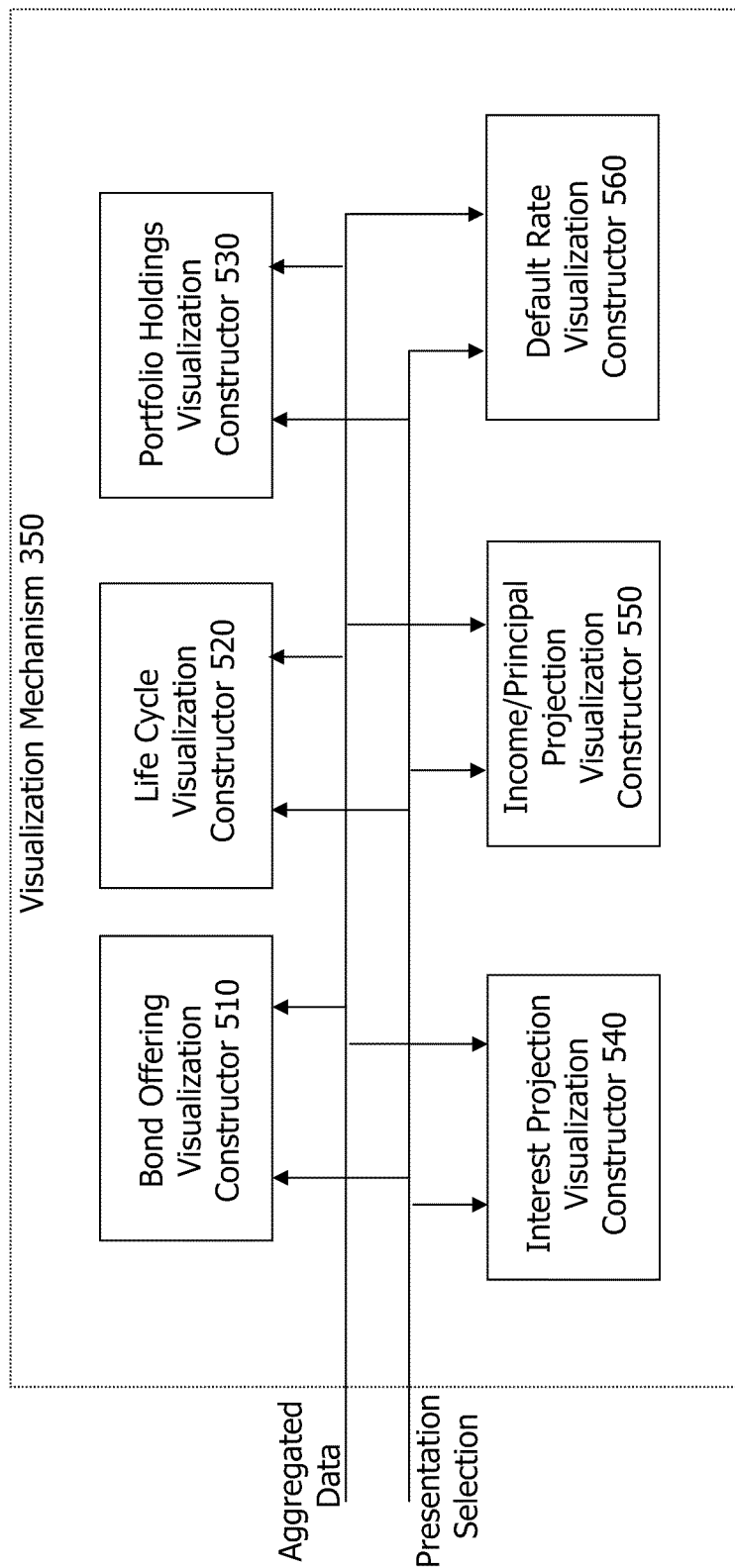
FIG. 5(a) depicts an exemplary internal structure of a visualization mechanism that is capable of generating various visual presentations for information related to fixed income market data.
FIGS. 5(b)-(n) illustrate exemplary visualizations of information related to fixed income securities.
Figure 5D:
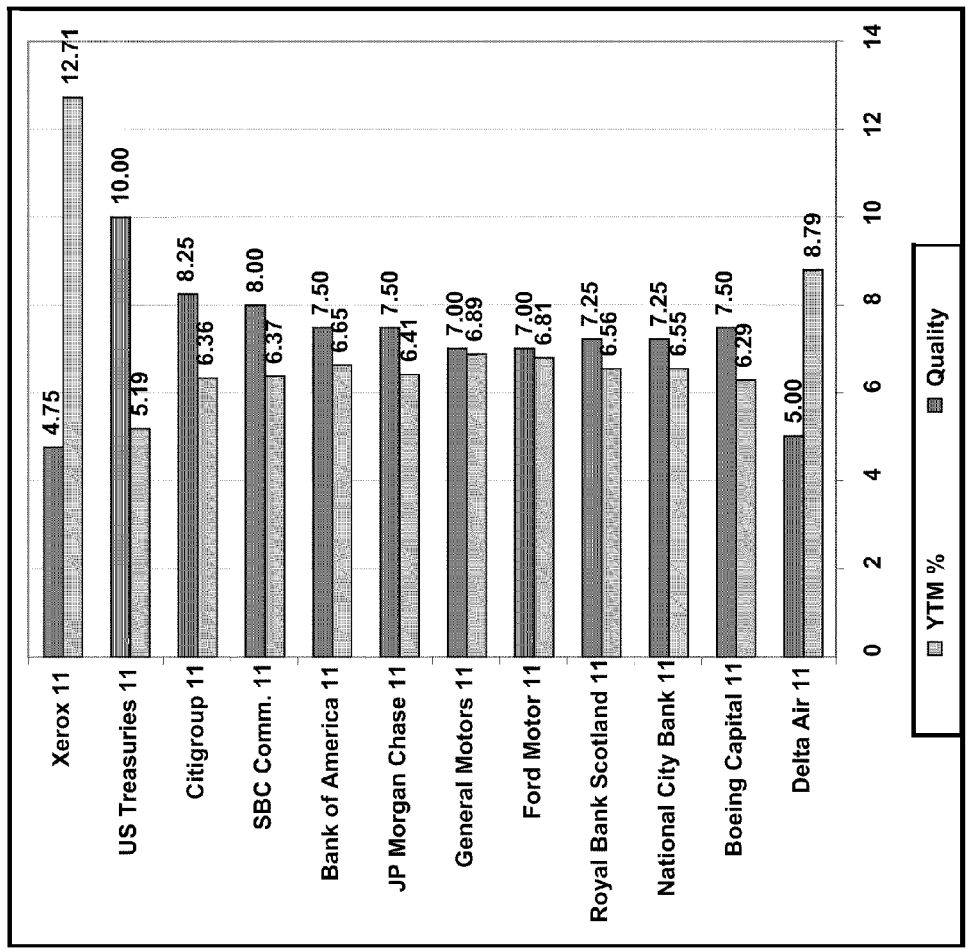
Figure 5E:
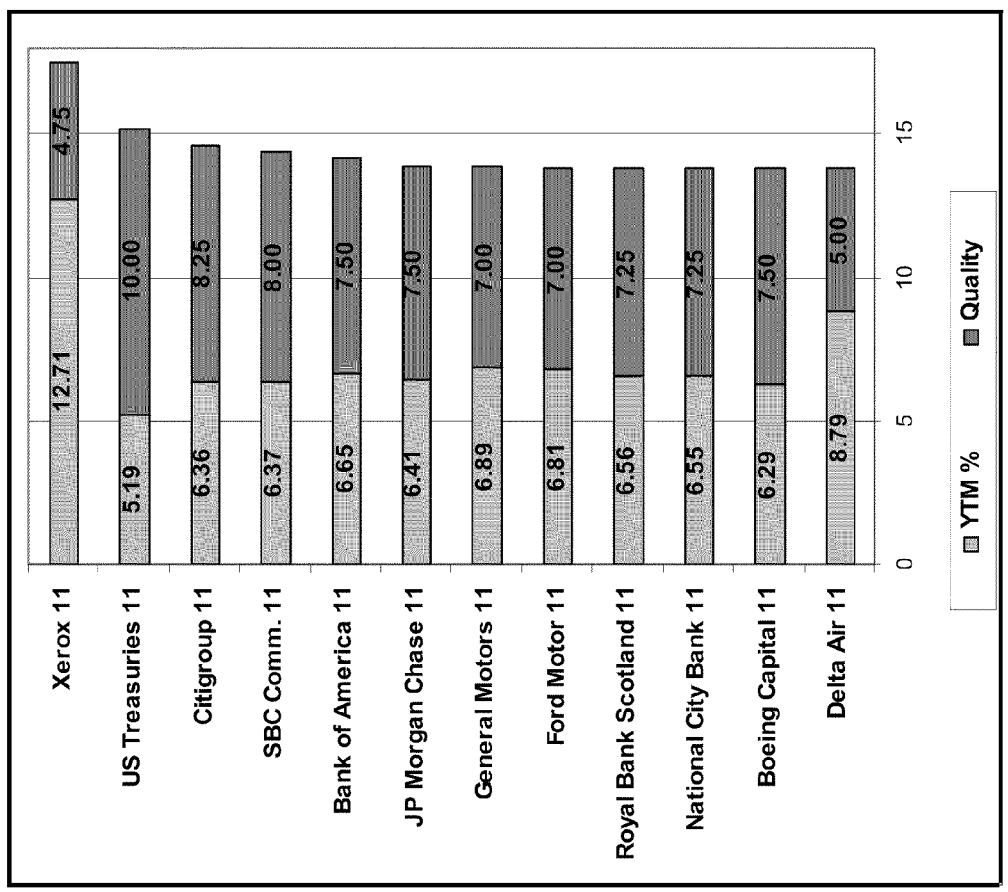

Different information may be incorporated in visualizing offerings. For example, FIGS. 5(c), 5(d), and 5(e) illustrate different visual presentations of fixed income bond offerings. Although symbolic ratings in these visualizations are not shown, they may also be incorporated into the visualizations. In these visualizations, different information such as yield to maturity (YTM %) measured in percentage and current yield (CY %) measured in percentage may be shown together with the converted ratings. The converted ratings of the securities are visualized in a similar fashion in FIG. 5(c) (third column) as in FIG. 5(b) where the higher the real value ratings are, the darker the background colors are (the colors of the visualized color blocks using converted color code are indicated using the abbreviation described above).

In FIGS. 5(d) and 5(e), a numeric conversion for the symbolic rating associated with each security is utilized with the YTM %. In FIG. 5(d), both the YTM % and the credit quality are visualized as horizontal bars with lengths of the bars reflecting the quantity associated with the YTM % and the numeric rating value converted from the symbolic rating of the corresponding security. The values of the YTM % and the converted ratings are simultaneously plotted on top of the bars. Although the (color) shades of the credit quality bars in the visualizations in FIGS. 5(d) and 5(e) do not change with the converted rating, it is understood by a person in the art that the color code discussed with reference to FIG. 4(a) may be applied to visualize the bars for credit qualities. Furthermore, in one implementation, the visualization schemes may aggregate credit qualities determined for one or more bonds or fixed income securities with maturity terms and yield representations associated with the bonds or fixed income securities. For example, a particular bond or fixed income security having an 8.00 credit quality, a ten year maturity term or time to maturity, and 5.75% yield may be visualized with an aggregated representation of "8/10/5.75," which may be visualized in a similar manner as shown in any one (or more) of FIGS. 5(b) through 5(n). Moreover, as shown in FIG. 4(c), the 8.00 credit quality for the particular bond or fixed income security may correspond to a Medium Dark Green (MDG) color code, which may be visualized in a similar manner as shown in any one (or more) of FIGS. 5(b) through 5(n) with an aggregated representation of "MDG/10/5.75."

The visualization schemes illustrated in FIGS. 5(d) and 5(e), although characterizing the same features of different offerings, the visual configurations of the horizontal bars corresponding to the YTM % and the credit quality are different. For example, the YTM % bar and the credit quality bar in FIG. 5(d) are adjacent to each other in the direction of left to right; while a credit quality bar in FIG. 5(e) is on top of a corresponding YTM % bar. Each visual configuration may provide its own appeal to a user. For example, since all the credit quality bars (of different securities) in FIG. 5(e) are plotted starting from the same point (right to the name of the security), relative credit qualities of different securities may be quickly evaluated by comparing the length of the bars.

Figure 5F:
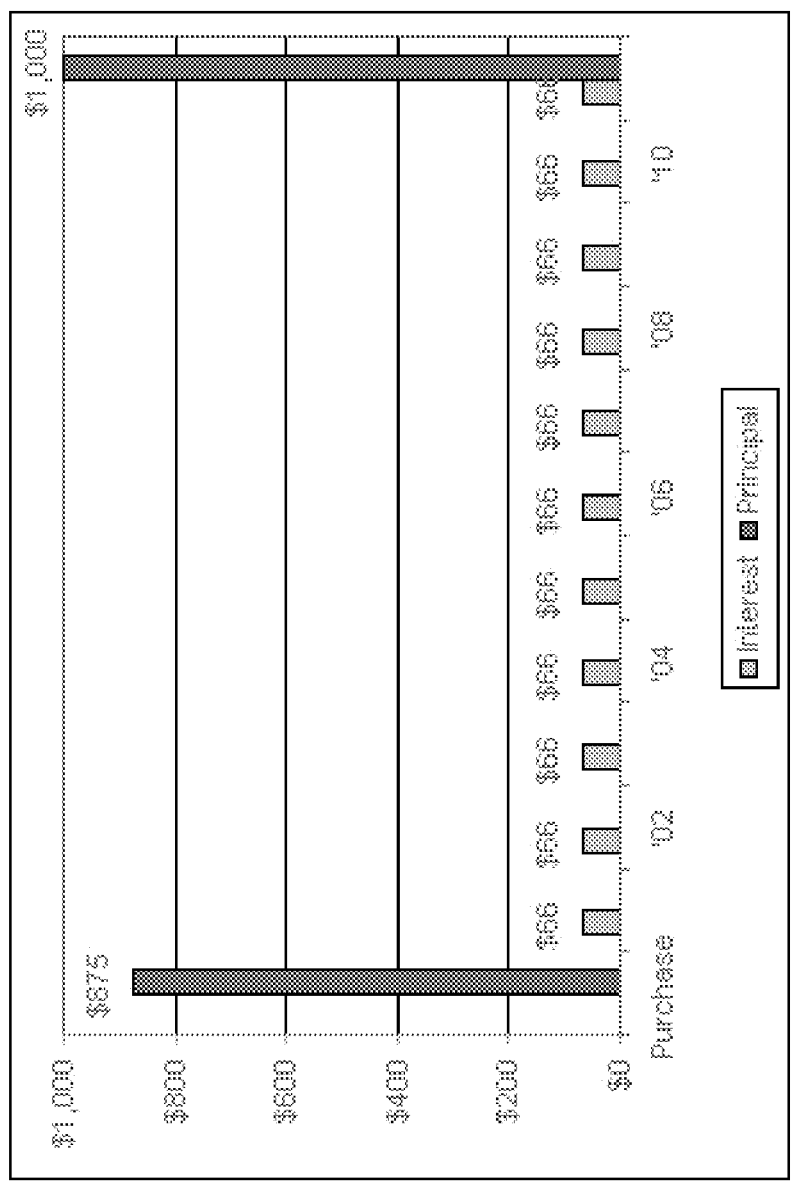

The user may also instruct the fixed income online retail enabling mechanism 130 to visualize information related to individual fixed income securities. The life cycle visualization constructor 520 may be designed to produce life cycle related visualizations based on characteristics of individual securities such as the length of years to maturity and the coupon rate. For example, FIG. 5(f) illustrates the visualization of the life cycle of a fixed income security. The X-axis represents time (measured in years) starting from the year of the purchase to the year of maturity. The Y-axis represents the amount of either principal or interest received over the period from the purchase date to the maturity date (life cycle of the bond). The plot shown in FIG. 5(f) corresponds to a distribution of investment and return. This provides the user a visualization of his/her return during the life cycle of the bond.

The portfolio holdings visualization constructor 530 is responsible for generating visualizations related to portfolio holdings using converted color codes and numeric values. Portfolio holdings may be visualized in different ways. FIG. 5(g) illustrates a visualization of the holdings within the portfolio of the user. The table shown in FIG. 5(g) displays a list of holdings in the portfolio, wherein each row provides information related to one particular holding. For example, the first column lists the name and maturity of the holding, the second column shows the coupon rate of the security, the third column visualizes the combined converted ratings for the security, and the fourth column indicates the number of this particular bond the user currently has (holds) in his/her portfolio.

Figure 5H:
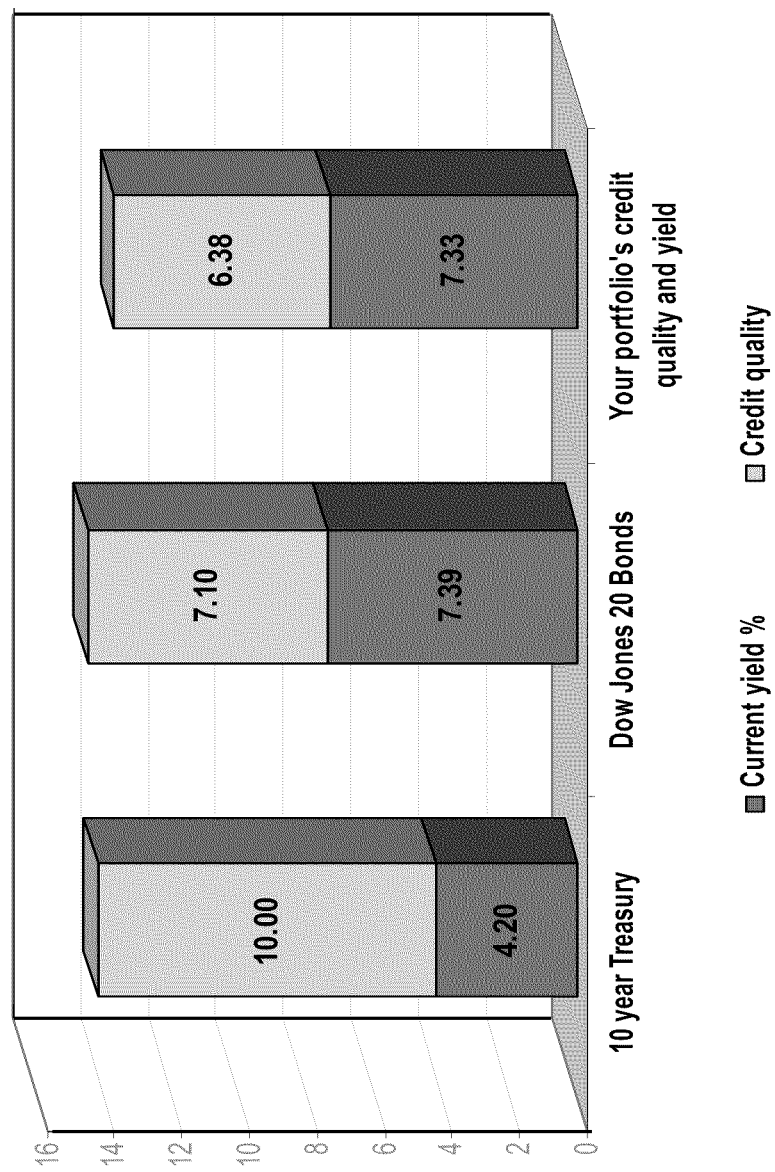

Using converted ratings (either the color codes or the numeric values) for securities in a particular portfolio may also be used to visualize the overall rating of the portfolio and optionally such visualization of the overall credit quality of the portfolio may be visualized in comparison with standard ratings such as the US Treasuries. FIG. 5(h) illustrates such an example, in which the overall credit quality and yield profile of a portfolio is visualized against the overall credit quality and yield profile of both the US Treasuries and the Dow Jones 20 Bonds Index. In FIG. 5(h), each of the three dimensional bar has two sections, one corresponding to the overall credit quality (the lower section of each bar) and the other corresponding to the current yield (the upper section). Each of the overall credit qualities (three) is characterized by both the height of the section and a converted numeric value. The height of the bar is proportional to the value of the converted numeric value. The color of the credit quality bar may also be visualized using the converted color code (not shown in FIG. 5(h)). The overall rating of the portfolio may be computed as, for example, an average across all the converted numeric values of the securities within the portfolio.

Some of the information visualized in FIGS. 5(g) and FIG. 5(h) may be created based on data dynamically acquired when the user requested the information. For example, the ratings (displayed in a combined fashion with both color code and real values) may be converted based on the symbolic ratings from different sources published (or issued) most recently. Similarly, the current yield for US Treasuries in FIG. 5(h) may also correspond to the most recent applicable rate.

Figure 5J:
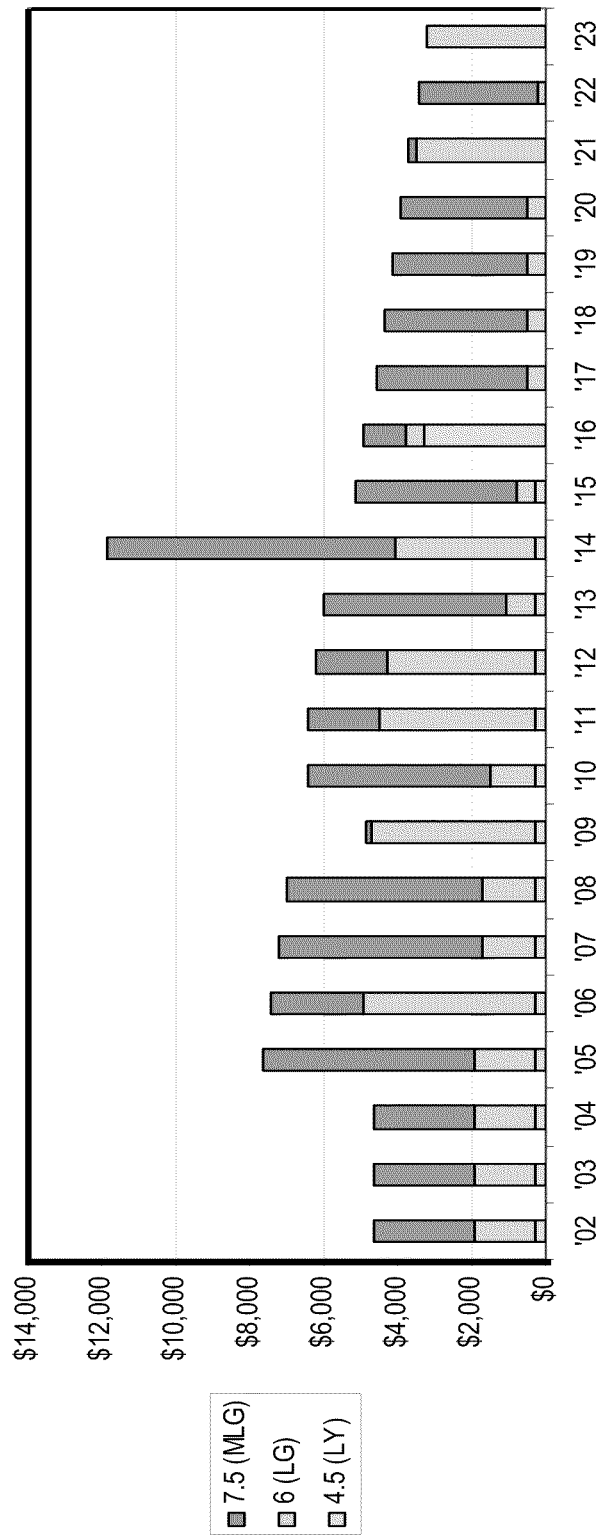

The interest projection visualization constructor 540 is responsible for generating various visualizations associated with interest information using converted color codes and numeric values of the corresponding symbolic ratings. FIG. 5(i) illustrates a visualization of interest projections related to bonds of different credit qualities within a portfolio. In FIG. 5(i), the first column lists consecutive years (e.g., from year 2002 to year 2023). The next three columns detail the coupon payments for three categories of bonds. One corresponds to a converted rating of 4.5 (the real value corresponding to a color code is displayed on a color block visualized using the color code and the exact color of the color block is indicated using the abbreviation scheme described earlier), one corresponds to a converted rating of 6.0, and the other corresponds to a converted real value rating of 7.5. Each category of bonds yields different interest amounts and is computed by summing the interest payments on the bonds within that credit quality category for that year. The interest received in the different quality categories is then summed to yield the total annual interest in the last column. The last row provides the summed interest over time in the individual credit qualities. The last element in the last row sums all the coupon payments for the various credit qualities and years. This number represents the total annual interest (coupon payments) for the investor's portfolio.

The income/principal projection visualization constructor 550 is responsible for generating visualizations related to income/principal projection information based on color codes or numeric values converted from corresponding symbolic ratings. FIG. 5(j) illustrates a visualization of income/ principal projection related to bonds of different ratings within a portfolio. In FIG. 5(j), bonds of three categories of converted ratings are illustrated. The X-axis represents year and the Y-axis represents dollar amount. Different colors represent the payment of income and principal for bonds of different ratings. For each year the different color portion in each bar corresponds to a different rating and the size (height) of that color portion corresponds to the amount of income/ principal. For example, in the year 2014 the user receives approximately $320 dollars from interest on securities rated 4.5, approximately $ 3,780 from interest and principal repayment on securities rated 6.0, and approximately $7,730 from interest and principal repayments on securities rated 7.5.

Figure 5K:
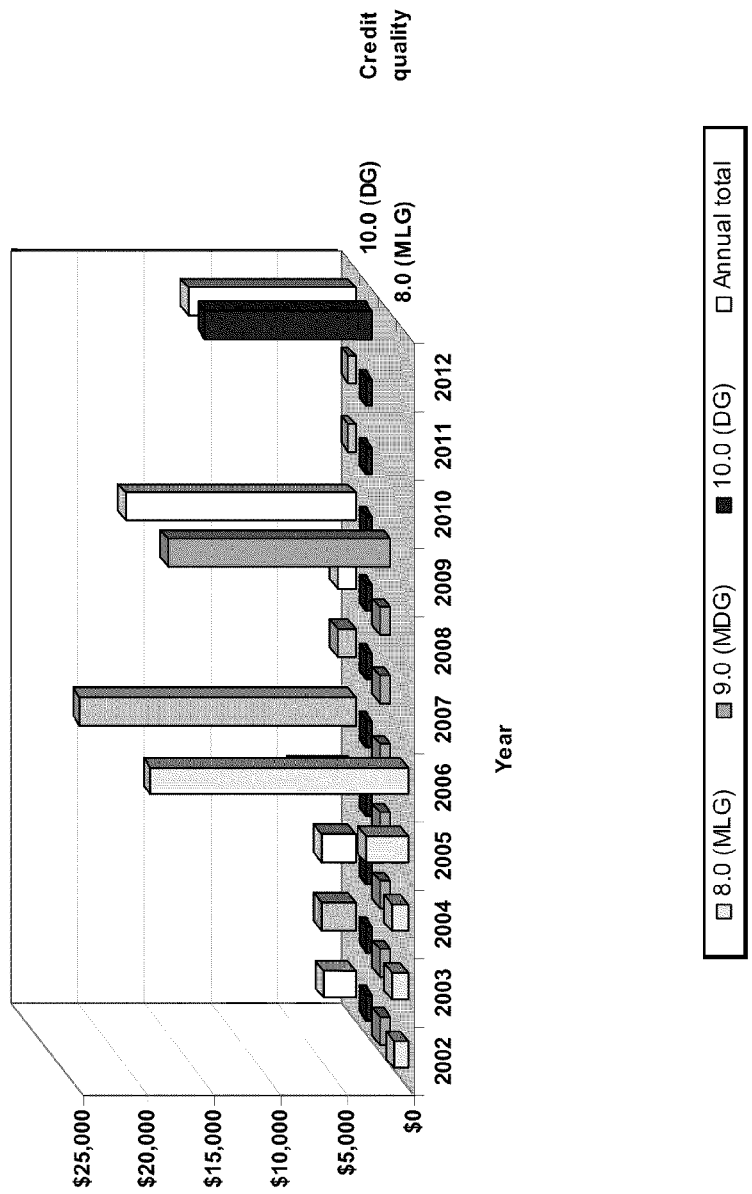
Figure 5I:
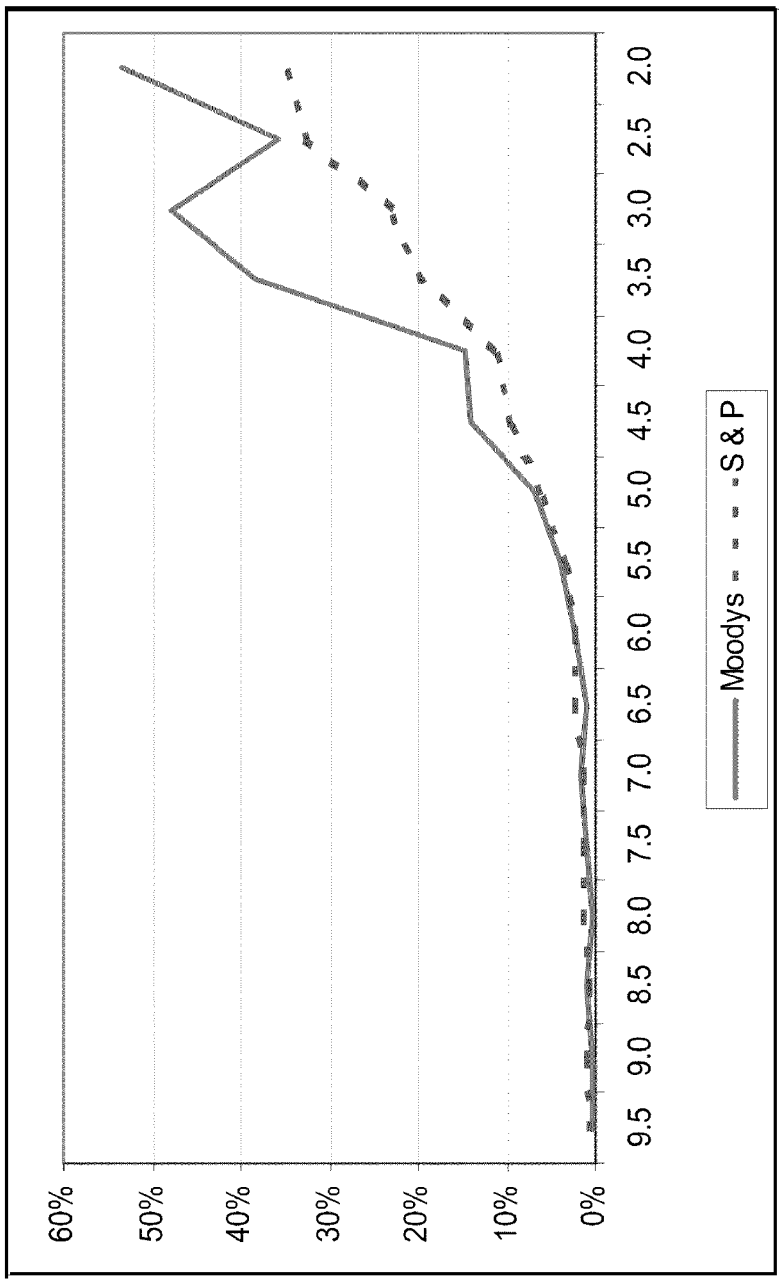

Income/principal projection related to bonds of different ratings within a portfolio may also be visualized in a three dimensional representation, as shown in FIG. 5(k). In this exemplary representation, the X-axis (horizontal) represents the year of maturity, the Y-axis (goes into the paper) represents credit quality (expressed in terms of converted numeric values), and the Z-axis (vertical) represents the dollar amount of the coupon and the principal payment. For example, in year 2006, the bonds having rating around 7.0 within the illustrated portfolio will provide income/principal, according to projection, of around $20,000. In FIG. 5(k), the last row along the Y-axis corresponds to the annual total of the coupon and principal payment. The annual total of a particular year may be computed as the total coupon and principal payments for all the bonds of all the ratings.

Figure 5M:
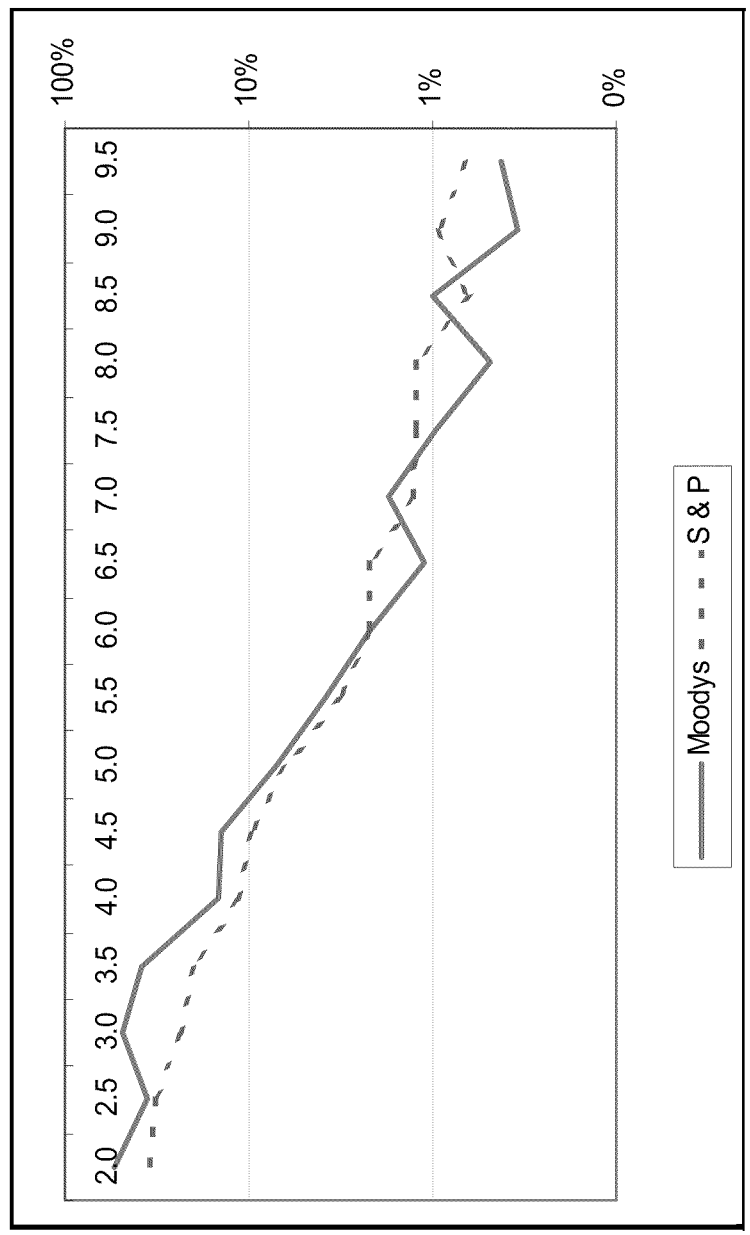

The default rate visualization constructor 560 is responsible for generating visualizations related to default rates. FIGS. 5(l) and 5(m) show how numeric rating values, converted based on symbolic ratings from different rating agencies, may be used to visualize the correlation between historical default rates and the ratings from different rating agencies. In FIG. 5(l), the X-axis represents the converted numeric values and the Y-axis represents the percentage of default. The two plots are shown, one representing the relationship between numeric ratings converted based on Moody's symbolic ratings and the other representing the relationship between numeric ratings converted based on S&P symbolic ratings. The higher the ratings are, the lower the default rates are. For instance, from FIG. 5(l), one can see that, historically, securities rated around 5.5 (converted from both Moody's and S&P) had default rate of approximately 4%. FIG. 5(m) visualizes the same relationships except the visualization is different.

Figure 5N:
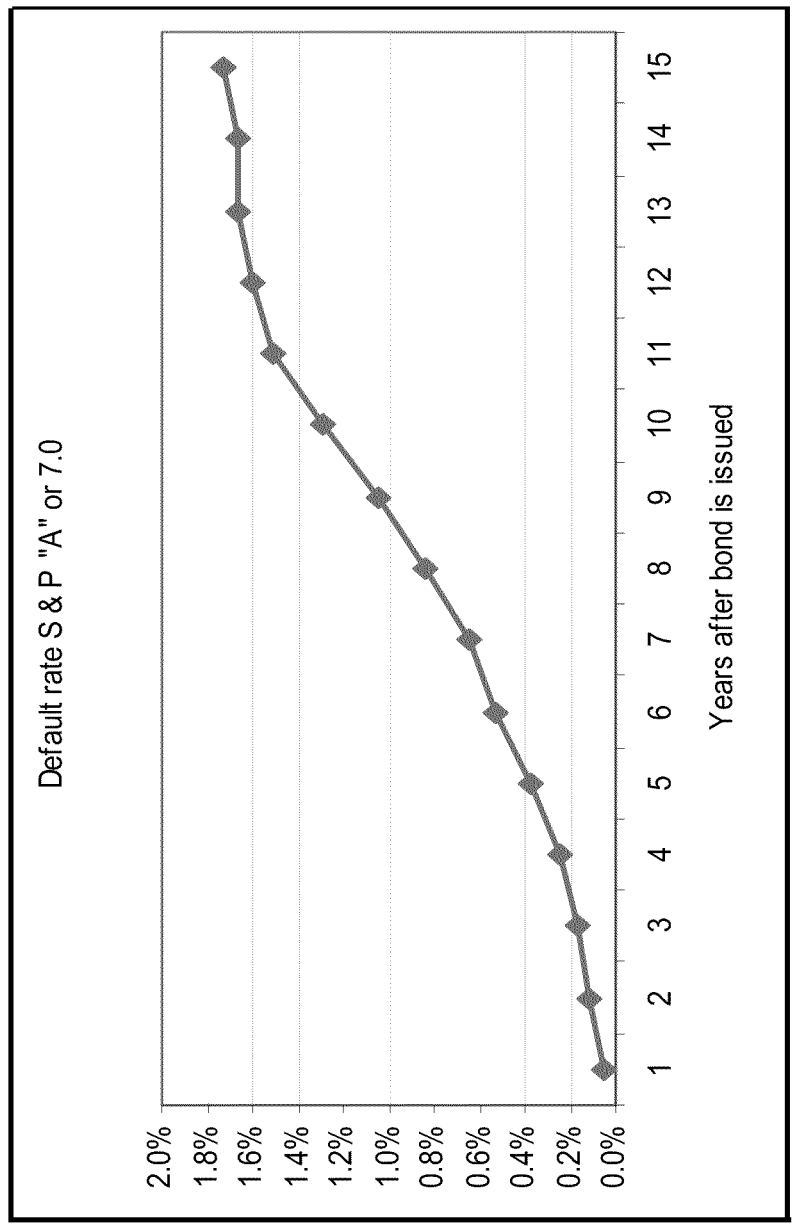

Numeric rating values may also be used as a criterion in determining the visualization content. This may be particularly useful when different rating agencies provide symbolic ratings that are difficult to harmonize. With a coherent converted rating expressed in a numeric fashion, the scale is well defined. In FIG. 5(n), the behavior of default rates of bonds having a particular rating with respect to the number of years of holding the bonds is visualized. The plot in FIG. 5(n) corresponds to securities that have S&P rating of "A" which corresponding to a converted numeric rating of 7.0.

Converted ratings, in the forms of both color code 430 and numerical values 460, may be used in any fashion desired. The illustrated embodiments of various visualizations are described as way of examples instead of limitations. The visualization mechanism 350 may be implemented to generate various visualizations based on a request from the user. According to application needs, the visualization mechanism 350 may be customized to realize different required visualization schemes. The visualization mechanism 350 may be implemented as an application deployed on a device that is capable of supporting computation required for visualization. Such a device includes a general purpose computer, a special purpose computer, a personal computer, a laptop, a personal data assistance (PDA), a cellular phone, or a wristwatch.

As described, the visualization mechanism 350 may correspond to a collection of visualization tools, each of which may be designed to realize one or more visualization schemes. Different visualization tools may be distributed on more than one device across a network. Such a network represents a generic network which may correspond to a local area network (LAN), a wide area network (WAN), the Internet, a wireless network, or a proprietary network.

Figure 6:
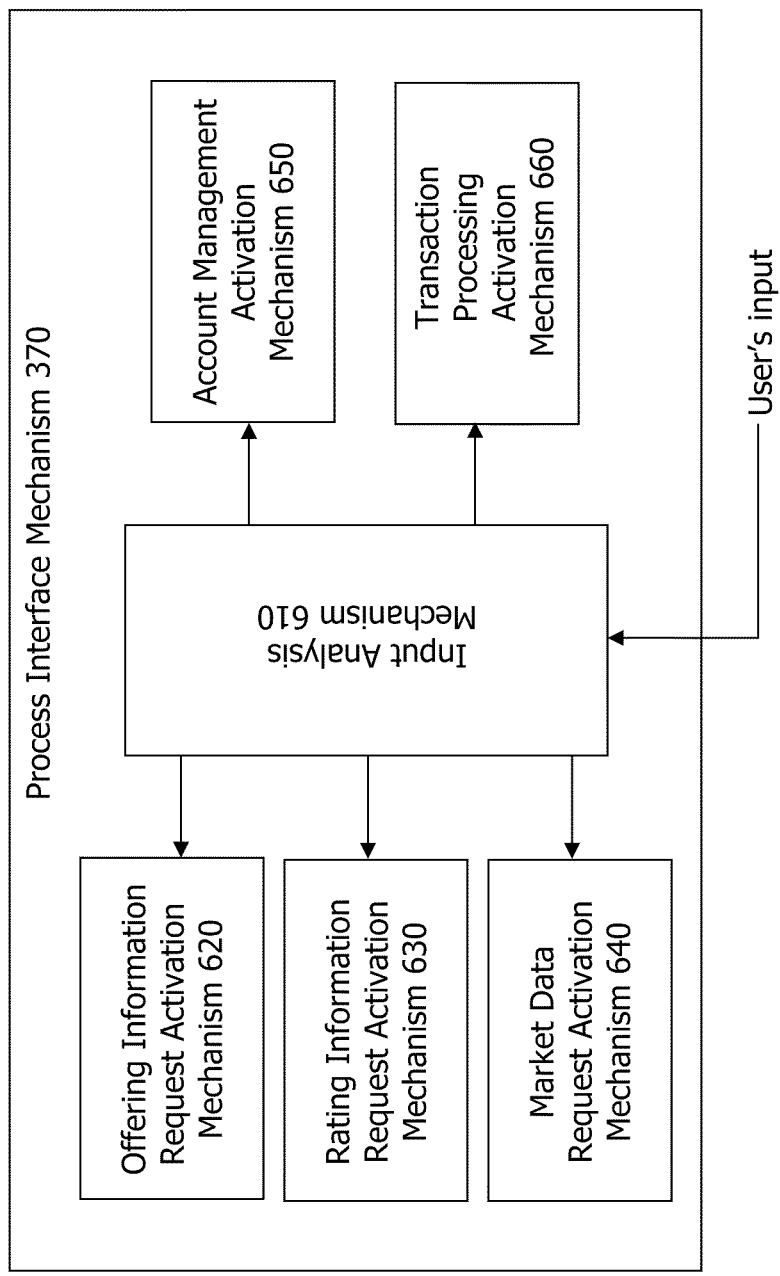
FIG. 6 depicts an exemplary internal structure of a process interface mechanism that activates different mechanism based on user's instructions.

FIG. 6 depicts an exemplary internal structure of the process interface mechanism 370 that activates different mechanisms located outside of the front-end engine 205 based on user's input. The process interface mechanism 370 comprises an input analysis mechanism 610 and a plurality of activation mechanisms including an offering information request activation mechanism 620, a rating information request activation mechanism 630, a market data request activation mechanism 640, an account management activation mechanism 650, and a transaction processing activation mechanism 660.

Based on user's input, the input analysis mechanism 610 determines which mechanism(s) to be activated and then invokes appropriate activation mechanism(s) accordingly. Each of the activation mechanisms activates one or more mechanisms outside of the front-end engine. During activation, appropriate data necessary for the activation may be gathered, organized, and forwarded to the mechanism to be activated. For instance, to activate account management mechanism (to perform some account management functions), the account management activation mechanism 650 may identify the account number from the user's input and then pass such information to the account management mechanism 265. Similarly, to activate the transaction processing mechanism 270, the transaction processing activation mechanism 660 may extract order related information from the user's input and forward such information to the transaction processing mechanism 270 in order to enable the transaction processing mechanism 270 to proceed with the transaction processing.

The offering information request activation mechanism 620 may be invoked when the user requests to check information related to certain fixed income securities. For example, the user may specify to examine information related to a particular set of securities identified according to some criteria (e.g., bonds offered that mature in the year 2011). To activate the offering management mechanism 230 to identify requested information, the offering information request activation mechanism 620 may extract necessary data (e.g., the criteria specifying maturity in 2011") to be used in locating the information from the users input and then send such data with the activation signal to the offering management mechanism 230.

The rating information request activation mechanism 630 and the market data request activation mechanism 640 may forward the identification of relevant securities (e.g., the CUSIPs of the bonds) to the corresponding rating management mechanism 240 and the market data management mechanism 250 when activating such mechanisms.

Figure 7:
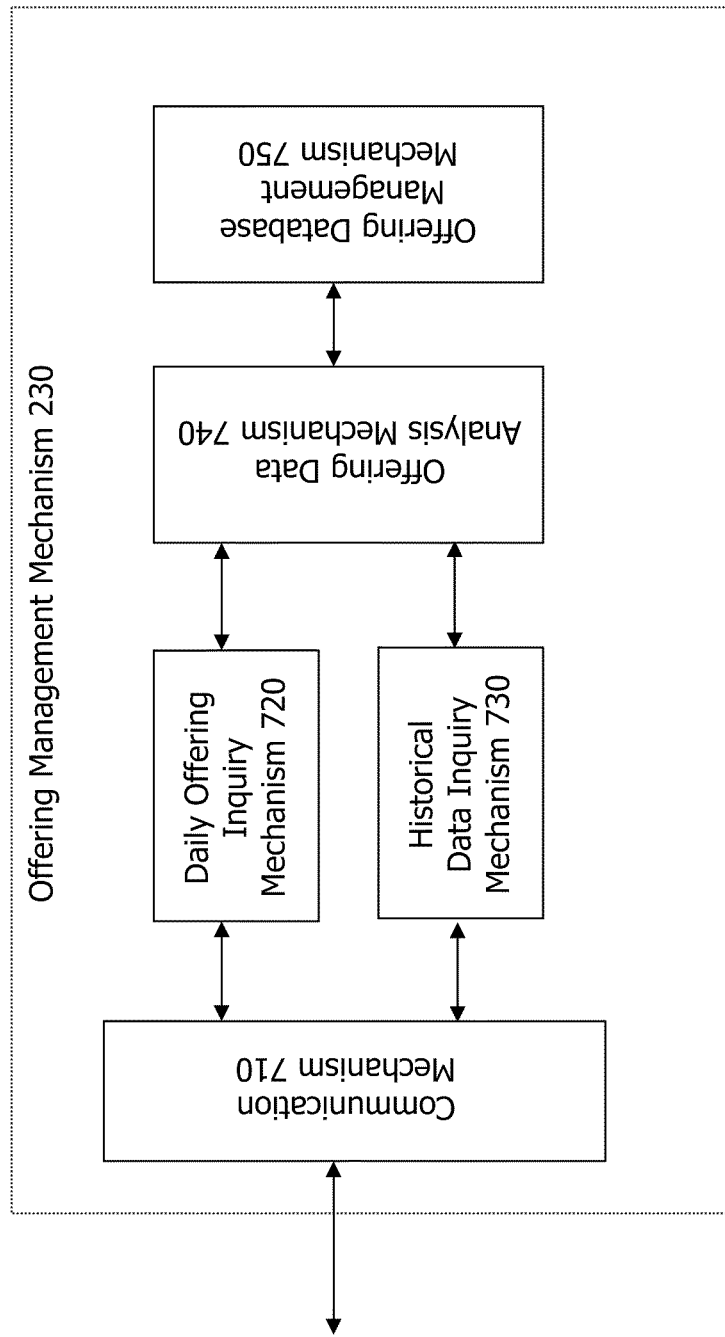
FIG. 7 describes an exemplary internal structure of an offering management mechanism.
Figure 8:
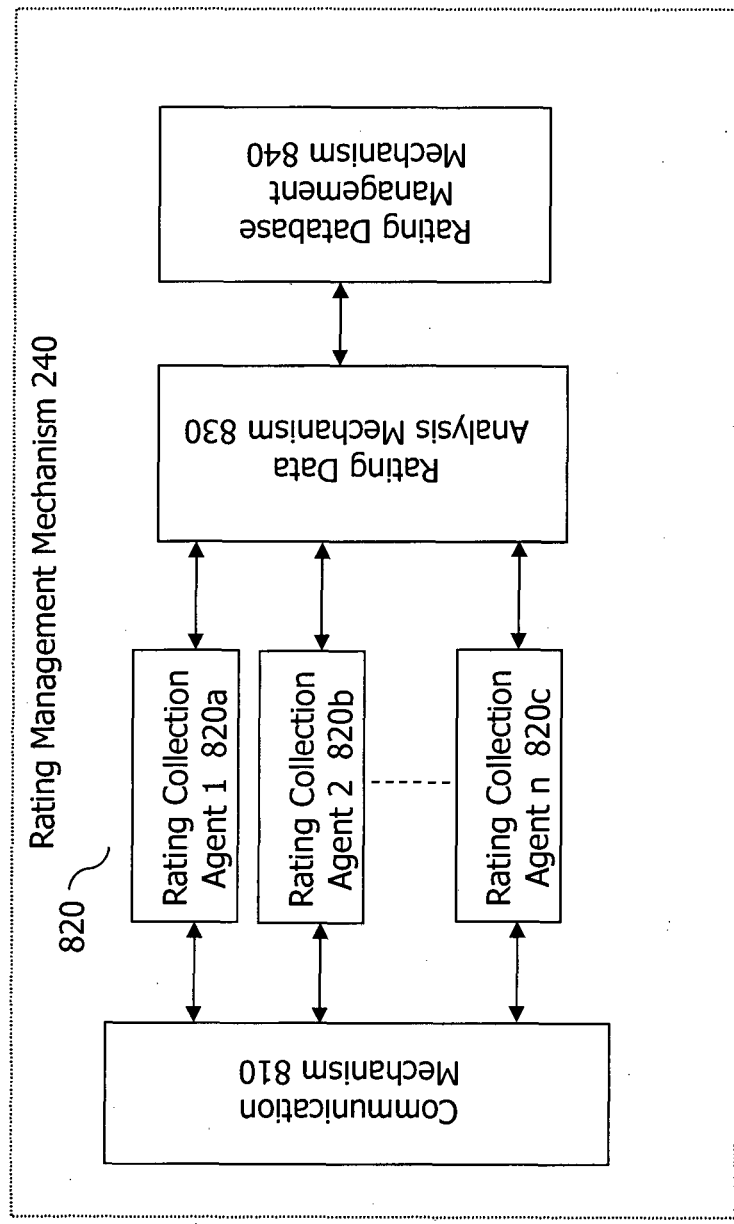
FIG. 8 describes an exemplary internal structure of a rating management mechanism.

FIGS. 7 and 8 describe exemplary internal structures of the offering management mechanism 230 and the rating management mechanism 240. As discussed earlier, the mechanisms within the data collection and management mechanism 225 are capable of collecting data from different sources, analyzing such collected data, and storing and managing the collected data.

The offering management mechanism 230 depicted in FIG. 7 comprises a communication mechanism 710, a daily offering requesting mechanism 720, a historical data requesting mechanism 730, an inventory data analysis mechanism 740, and an inventory database management mechanism 750. The communication mechanism 710 facilitates the need of the offering management mechanism 230 to communicate with, for example, the fixed income capital markets, to gather desired information (e.g., offering information).

The daily offering requesting mechanism 720 is capable of collecting offering data via the communication mechanism 710. The historical data requesting mechanism 730 is responsible for collecting historical data related to certain bonds, via the communication mechanism 710, from various sources. It is possible that both the daily offering requesting mechanism 720 and the historical data requesting mechanism 730 gather data from the same sources. In this case, the two may be implemented as an integrated entity (not shown in FIG. 7).

The collected data (offerings or historical data) may be stored or forwarded to other mechanisms for presentation purposes. Prior to such uses, the inventory data analysis mechanism 740 may also analyze the collected data to either generate new data or merely organizing the data. For example, useful statistics, such as the average yield by credit rating and maturity, may be computed based on the collected data and such newly generated information may also be stored and used. The inventory database management mechanism 750 is responsible for organizing, indexing, storing inventory related data in the inventory database 235.

FIG. 8 describes an exemplary internal structure of the rating management mechanism 240, according to embodiments of the present invention. The rating management mechanism 230 comprises a communication mechanism 810, a plurality of rating collecting agents 820 (agent 1 820a, agent 2, 820b, . . . , agent n 820c) that gather symbolic ratings from different sources, a rating data analysis mechanism 830, and a rating database management mechanism 840. The communication mechanism 810 facilitates the need of the rating collection agents 820 to communicate with, for example, various rating institutions 140, to gather desired rating information.

The rating collection agents 820 are capable of collecting rating related data via the communication mechanism 810. Each of the rating collection agents may be responsible for collecting rating information from a single source (e.g., agent 1 820a is responsible for collecting rating information from Moody's and agent 2 820b may be responsible for collecting rating data from Fitch). Each may be designed differently to interface with different rating institutions. It is also possible to implement a single agent responsible for collecting rating information from all possible sources (not shown in FIG. 8).

The collected rating information (offerings or historical data) may be stored or forwarded to other mechanisms for presentation purposes. Prior to such uses, the rating data analysis mechanism 830 may analyze the rating information to categorize the gathered information. For example, collected rating data may include both the symbolic ratings as well as their semantic interpretations. Symbolic ratings may be separated from their semantic interpretations (different categories of information) so that ratings and semantic interpretations may be managed more efficiently. Yet, the correspondence between the two may be retained using, for example, appropriate indices.

Figure 9:
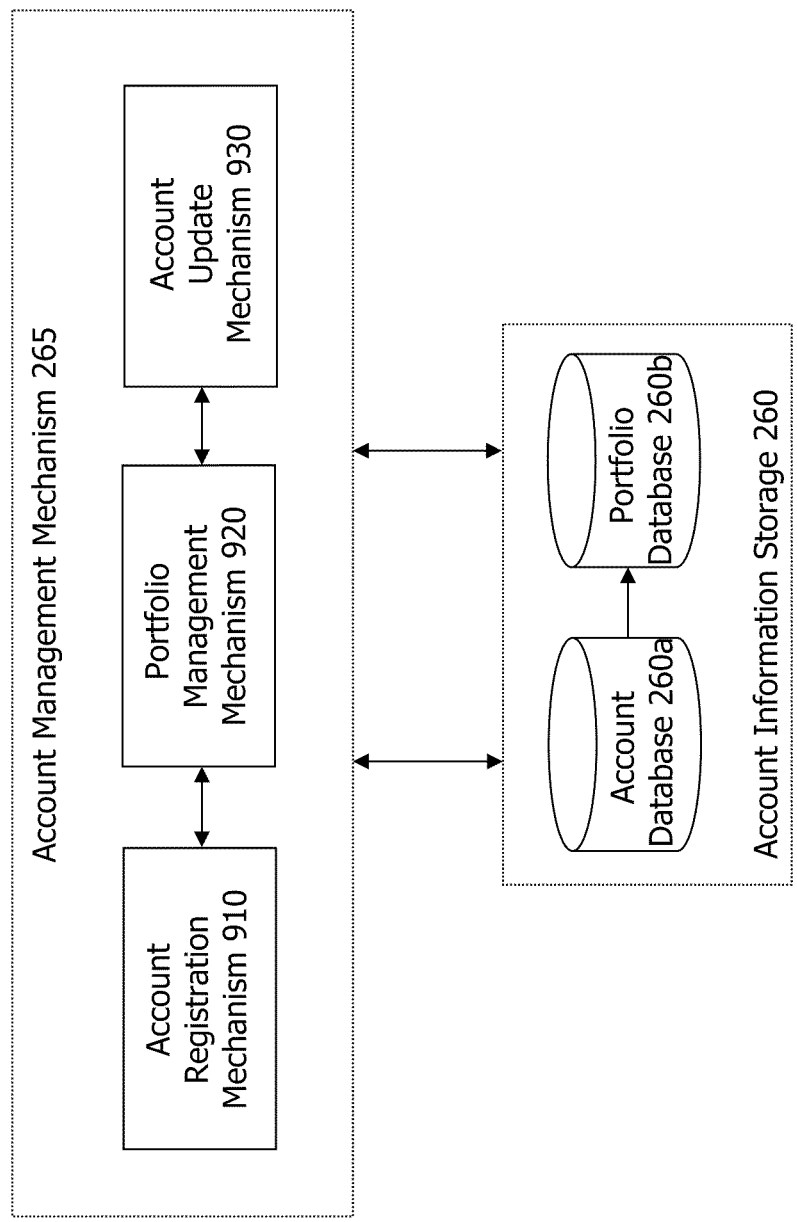
FIG. 9 describes an exemplary internal structure of an account management mechanism.

FIG. 9 describes an exemplary internal structure of the account management mechanism 265. The account management mechanism 265 may include, but are not limited to, an account registration mechanism 910, a portfolio management mechanism 920, and an account update mechanism 930. The account registration mechanism 910 is responsible for registering new users. This may include creating a new account using information from a new user and initializing the content of the new account such as the portfolio of the new user. The portfolio management mechanism 920 is responsible for managing portfolios corresponding to existing users. The portfolio management mechanism 920 may adaptively update portfolio information according to, for example, credit rating upgrades and downgrades.

The account update mechanism 930 is responsible for any changes to be made to existing accounts, including deleting an existing account or updating the account information such as address changes. The account registration mechanism 910 may interact with the portfolio management mechanism 920. For instance, when a new account is created, a portfolio may be initially set up through the portfolio management mechanism 920 to allow for the transfer of securities from an account at another brokerage firm. In addition, the account update mechanism 930 may also interact with the portfolio mechanism 920. For example, when an existing account is deleted (closed), the assets in the corresponding portfolio may be transferred so that the portfolio is updated to reflect that.

All the mechanisms within the account management mechanism 265 interact with the account information storage 260. The account database 260a and the portfolio database 260b may be managed as separate (yet linked) entities or as an integrated entity. The implementation decision maybe made according to application needs or practicality.

Figure 10:
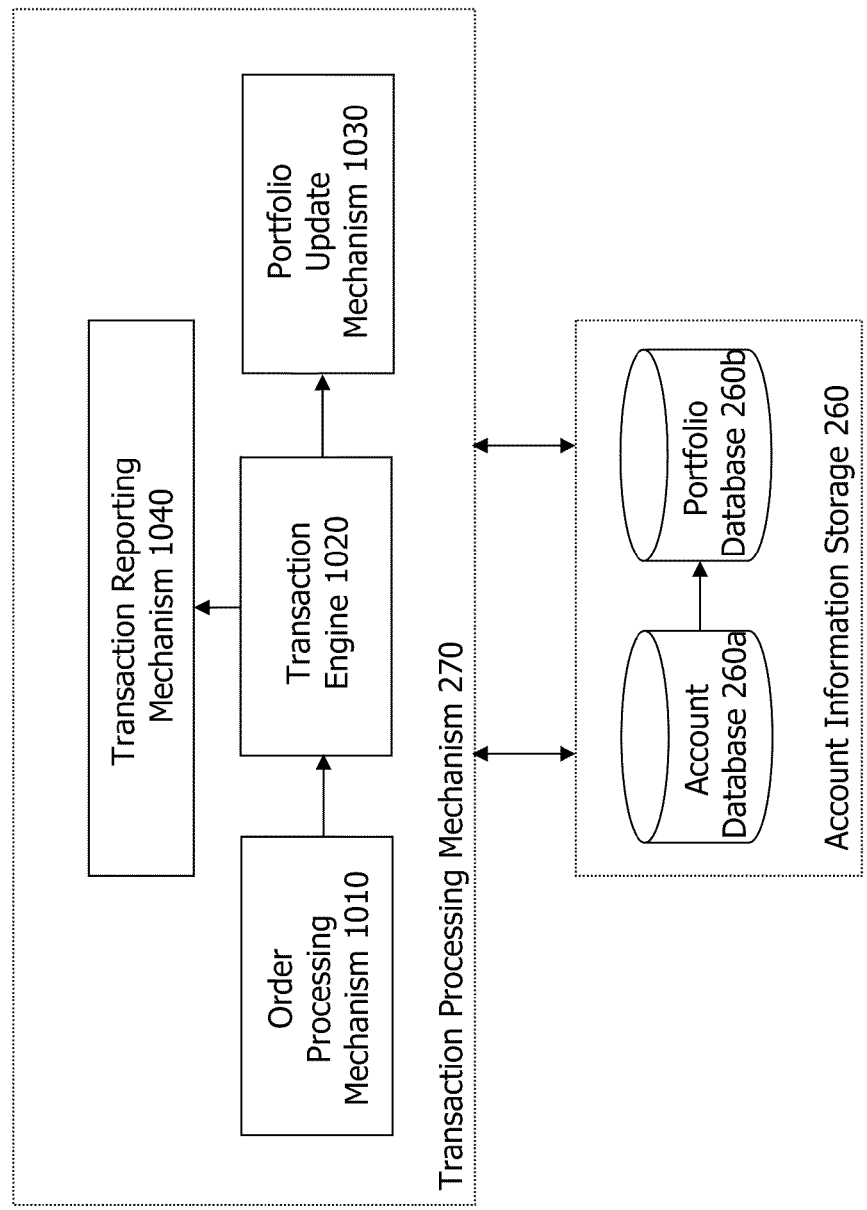
FIG. 10 describes an exemplary internal structure of a transaction processing mechanism for online trading of fixed income securities.

FIG. 10 describes an exemplary internal structure of the transaction processing mechanism 270 for trading fixed income securities. The transaction processing mechanism 270 may include an order processing mechanism 1010, a transaction engine 1020, a portfolio update mechanism 1030, and a transaction reporting mechanism 1040. The order processing mechanism 1010 may receive an order from the user (e.g., forwarded from transaction processing activation mechanism 660 in the process interface mechanism 370, see FIG. 6) for trading certain fixed income securities. The received order is processed to prepare for the transaction. For example, the identification of the bonds to be traded may be extracted from the order.

The transaction engine 1020 is then activated to carry out the transaction. This may include informing the counterparty of the specifics of the order and the creation of an internal identification number for the order so auditing trails can be established. When the transaction is completed, the transaction engine 1020 may invoke the portfolio update mechanism 1030 to update the portfolio to reflect the changes in the account holdings. The transaction is then reported to an authorized site (e.g., NASDAQ's Transaction Reporting And Compliance Engine or TRACE) through the transaction reporting mechanism 1040.

Figure 11:
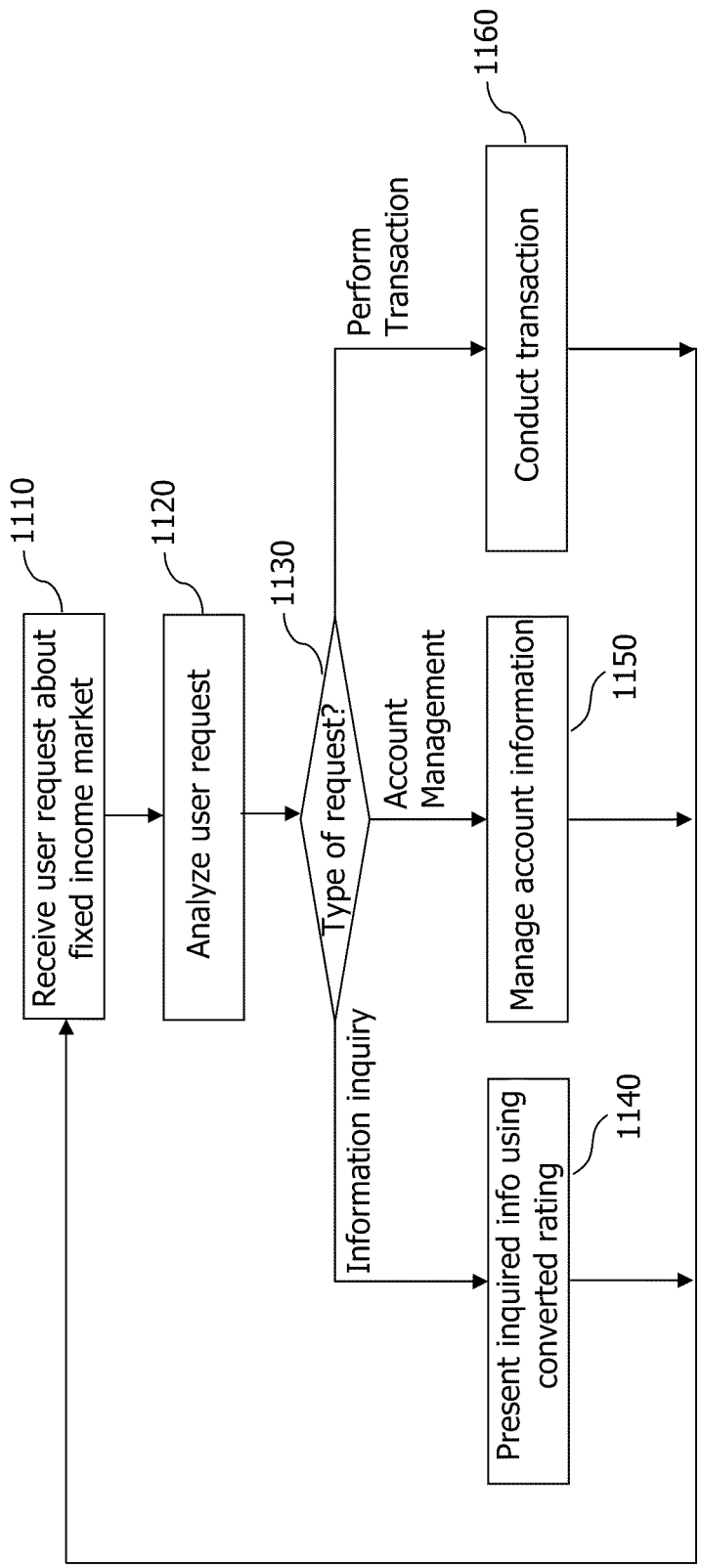
FIG. 11 is a flowchart of an exemplary process, in which a user performs operations related to online trading of fixed income securities via a fixed income online retail enabling mechanism.

FIG. 11 is a flowchart of an exemplary process, in which the user performs operations related to online trading of fixed income securities via the fixed income online retail enabling mechanism 130. The fixed income online retail enabling mechanism 130 first receives, at act 1110, a request from the user. The request is analyzed at act 1120. Based on the type of the request, determined at act 1130, different parts of the fixed income online retail mechanism 130 is activated to facilitate the needs of the user.

If the request relates to information inquiry (e.g., information related to offerings), the fixed income online retail enabling mechanism 130 presents, at act 1140, requested information in a visual form with converted ratings. More details about the acts performed to present requested information are described with reference to FIGS. 12-15. If the request relates to managing account information, the fixed income online retail enabling mechanism 130 interacts with the user to facilitate the need in managing the account information at act 1150. Details related to specific acts performed to facilitate the management of account information are described with reference to FIG. 16. If the request involves a bond trade transaction, the fixed income online retail enabling mechanism 130 interacts with the user to conduct, at act 1160, a transaction. Details related to how to complete a transaction are discussed with reference to FIG. 17.

Figure 12:
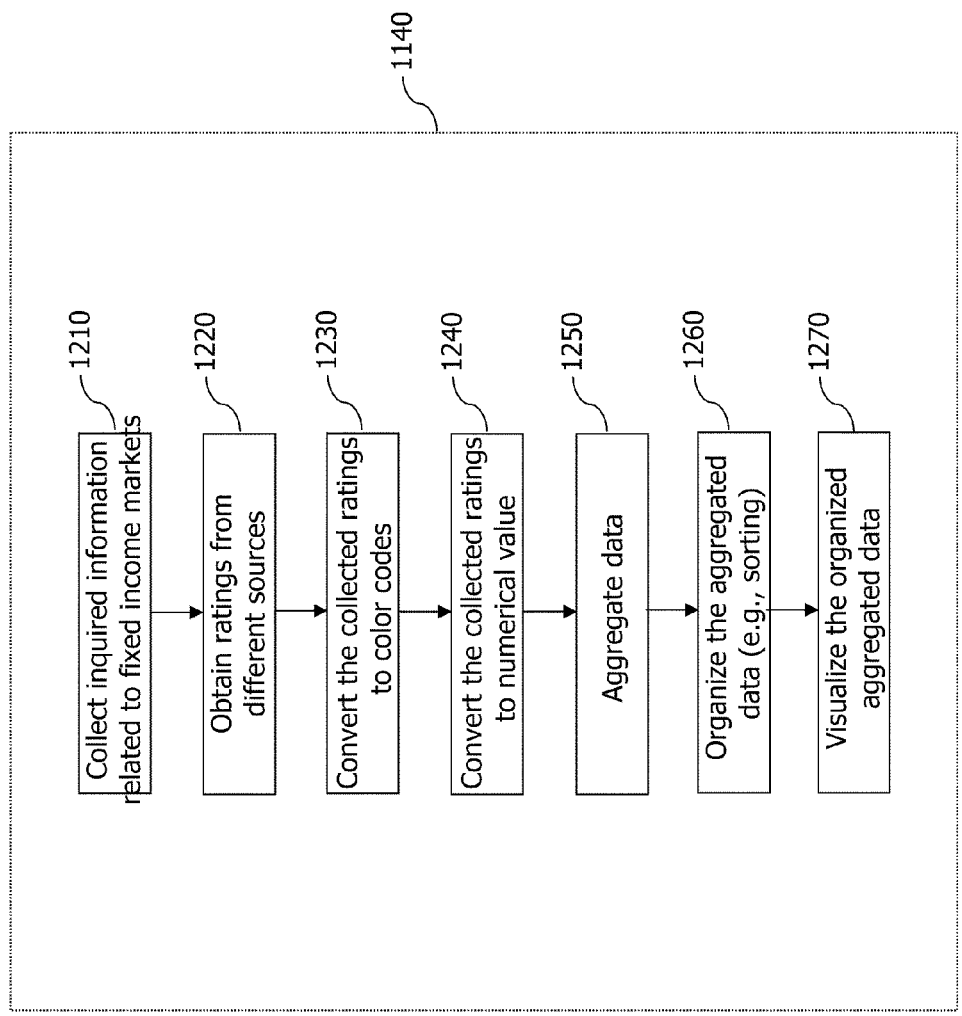
FIG. 12 is a flowchart of an exemplary process, in which a fixed income online retail enabling mechanism visually presents information related to fixed income capital markets to a user.

FIG. 12 is a flowchart of an exemplary process, in which the fixed income online retail enabling mechanism 130 visually presents information related to fixed income capital markets to the user. Inquired information related to fixed income capital markets is first collected at act 1210. Data collected may be public information or proprietary information. For example, if the user asks to see information related to current offerings (public information) of fixed income securities, such offering information may be collected. As another example, market data such as commentary information related to certain securities may be collected from different sources. Such market data includes news items, equity prices and press releases relating to a firm whose fixed income security is offered for sale. Such collected public data may also be used to generate proprietary information. For instance, the difference in price between a US Treasury bond (10.0) maturing in 2011 and a 9.5 (AAA/Aaa) bond maturing in 2011 can be collected and proprietary data generated that will help inform an investor when one of these securities is inexpensive relative to the other on an historical basis. Such prediction may be generated within the fixed income online retail enabling mechanism 130 or may be generated by some business partners. Such proprietary prediction information may also be collected at act 1210 as part of relevant data.

Symbolic ratings associated with the inquired bonds are then obtained, at act 1220, from different sources. To generate effective visual presentation of the inquired information, the symbolic ratings are converted into color codes, at act 1230, and real values, at act 1240. Details related to the conversions are discussed with reference to FIGS. 13 and 14. Other types of information may also be gathered for presentation purposes.

Based on information gathered so far, such information is aggregated, at act 1250, to satisfy different presentation needs. For example, some presentations may require the display of the original symbolic ratings but some may not. The aggregated data may be further organized, at act 1260, in a certain fashion for display. For instance, a list of offerings may be organized in a sequence arranged according to the descending order of the converted ratings in real value. The same list of offerings may also be organized in a sequence arranged in terms of the alphabetic order of the names of the offering corporations or in descending order of yield to maturity or current yield.

As alternatives, the information may also be organized in different manners according to the information associated with each offering. For instance, each of the offerings may be associated with a series of information such as symbolic ratings from different sources, converted color code and real value, YTM (yield to maturity), CY (current yield). Different presentations may be constructed by including different types of information. The information is organized according to either the user's preference or some predetermined format. Such organized data is then used for visualizing, at act 1270, the inquired information. Specifics related to visualizing the inquired information are described with reference to FIG. 15.

Figure 13:
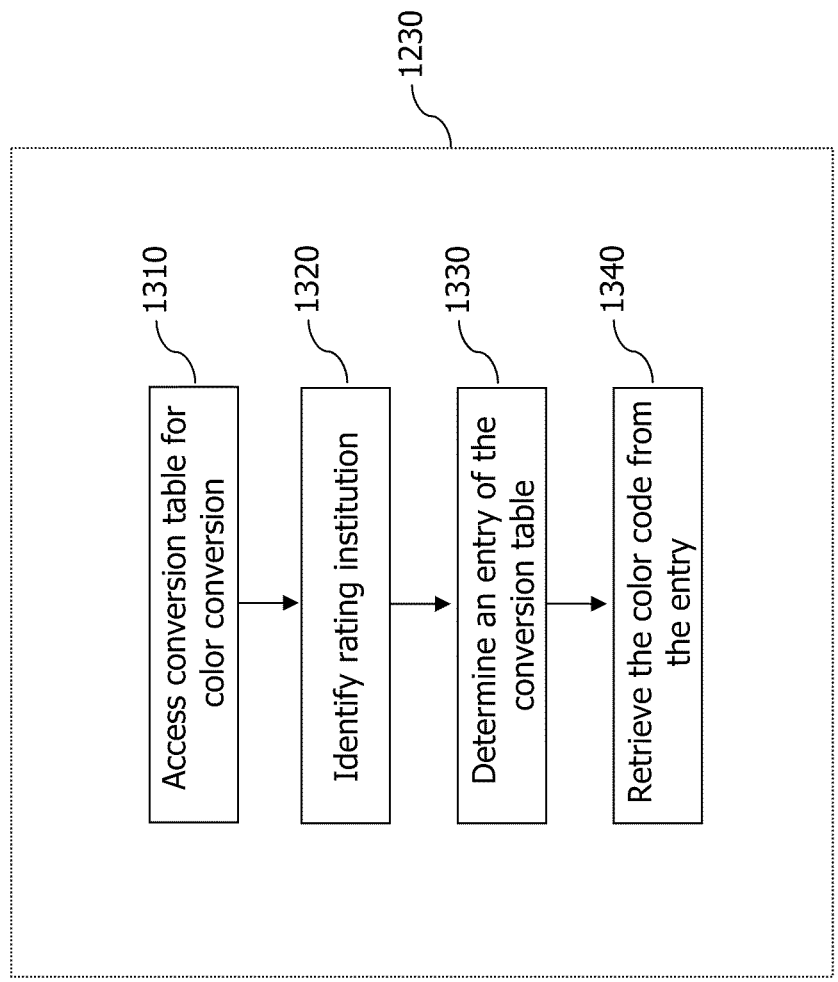
FIG. 13 is a flowchart of an exemplary process, in which a symbolic rating obtained from a rating institution is converted into a color code.

FIG. 13 is a flowchart of an exemplary process, in which a symbolic rating obtained from a rating institution is converted into a color code. As discussed earlier, different embodiments of converting a symbolic rating to a color code may be employed. In FIG. 13, the conversion procedure of using a pre-constructed table to achieve the symbolic rating to color code conversion is described. To convert a given symbolic rating into a color code, a conversion table constructed for such purposes is first accessed at act 1310. The conversion table provides specific conversions from symbolic ratings from different rating institutions to color codes.

To determine a specific conversion, the source of the given symbolic rating is identified at act 1320. Such identified source of the rating and the symbolic rating itself can be used to determine, at act 1330, an entry to the conversion table. For example, given a symbolic rating "AAA" and the corresponding rating institution "S&P," an entry in the conversion table can be uniquely located. The color code stored in such determined entry can then be retrieved, at act 1340, to accomplish the conversion.

Figure 14:
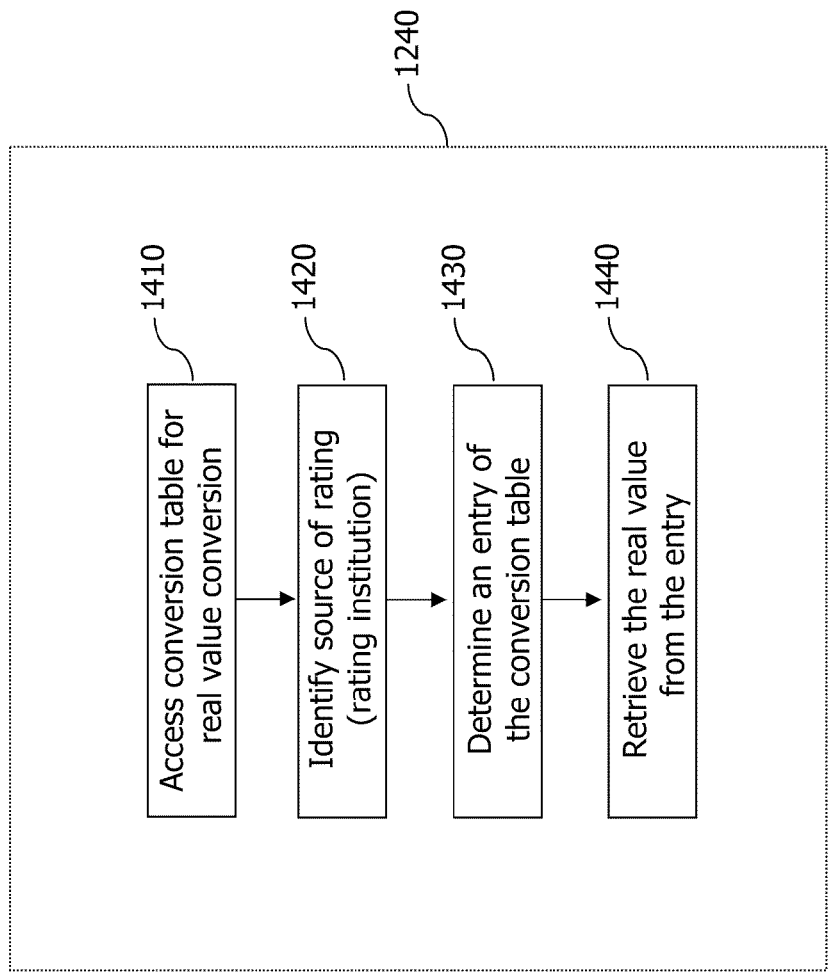
FIG. 14 is a flowchart of an exemplary process, in which a symbolic rating obtained from a rating institution is converted into a real value.

FIG. 14 is a flowchart of an exemplary process, in which a symbolic rating obtained from a rating institution is converted into a real value. As discussed earlier, different embodiments of converting a symbolic rating to a real value may be employed. In FIG. 14, the conversion procedure of using a pre-constructed table is described. To convert a given symbolic rating to a real value, a conversion table constructed for such purposes is first accessed at act 1410. The conversion table provides specific conversions from symbolic ratings from different rating institutions to real values within a predetermined range.

To determine a specific conversion, the source of the given symbolic rating is identified at act 1420. Such identified source of the rating and the symbolic rating itself can be used to determine, at act 1430, an entry to the conversion table. For example, given a symbolic rating "AAA" and the corresponding rating institution "S&P," an entry in the conversion table can be uniquely located. The real value stored in such determined entry can then be retrieved, at act 1440, to accomplish the conversion.

Figure 15:
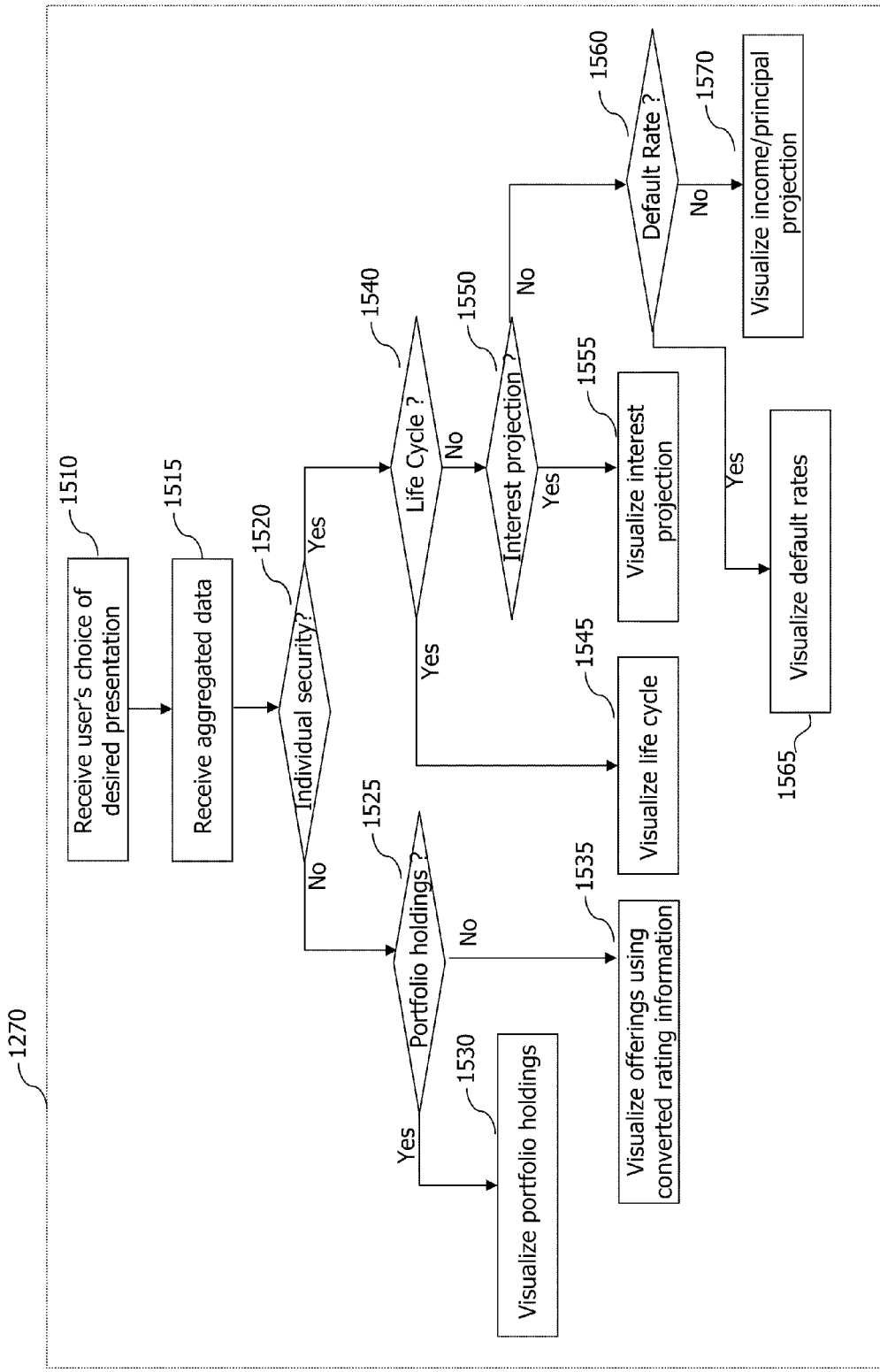
FIG. 15 is a flowchart of an exemplary process, in which a visualization mechanism constructs different visualizations based on information related to different aspects of fixed income securities and converted ratings according to user's choice.

FIG. 15 is a flowchart of an exemplary process, in which the visualization mechanism 350 constructs different visualizations based on information related to different aspects of fixed income securities and converted ratings according to user's choice. The specified choice of presentation from the user is first received at act 1510. For instance, the user may specify to review information related to bond offerings. The visualization mechanism 350 then receives, at act 1515, the inquired information that has been appropriately aggregated and organized (by the data aggregation mechanism 330 and the data analysis mechanism 340).

Depending on the types of presentation requested (by the user), determined at act 1520, the visualization mechanism 350 performs different visualization operations. There may be different exemplary categories of presentations. One may correspond to visual presentation of information related to a list of bonds. The other may correspond to visual presentation of different properties related to a particular bond. At act 1520, the visualization mechanism 350 may distinguish visualization operations related to visualizing information related to a plurality of bonds from visualization operations related to a particular bond.

If the user requests to visualize information related to a plurality of bonds, the visualization mechanism 350 may further distinguish whether the requested information is associated with a particular portfolio (e.g., holdings of the user) or corresponds to general bond offerings (e.g., daily bond offerings). Such distinction may be necessary due to the fact that different scenarios may require different presentations. If the requested presentation is based on the holdings of a particular portfolio, determined at act 1525, the visualization mechanism 350 presents visualization, at act 1530, of the holdings to the user. If general offering information is to be visualized, the visualization mechanism 350 visualizes, at act 1535, the offerings with converted rating information to the user.

Information related to an individual bond may be visualized in different ways, depending on which particular feature of the bond is requested. To request to visualize different aspects of a particular bond, the user who requests the information may or may not hold that bond. That is, the bond whose information is requested may or may not be a holding of the user who requests the information. For example, the user may request to review the life cycle of a particular bond, determined at act 1540. The bond whose life cycle is being visualized may be a holding of the user. The bond may also be simply a current offering (i.e., the user does not have that holding yet). The user may also request to visualize the interest projection of a particular bond, determined at act 1550. Furthermore, the user may like to see the income/principal projection of a specific fixed income bond or the default rates of different bonds according to historical data, determined at act 1560. Information related to other properties associated with a fixed income security may also be gathered and visualized (not shown in FIG. 15). Depending on the specific types of information requested, the visualization mechanism 350 accordingly performs appropriate visualization operations at acts 1545 (visualize life style), 1555 (visualize interest projection), 1565 (visualize default rates), and 1570 (visualize income/principal projection).

Figure 16:
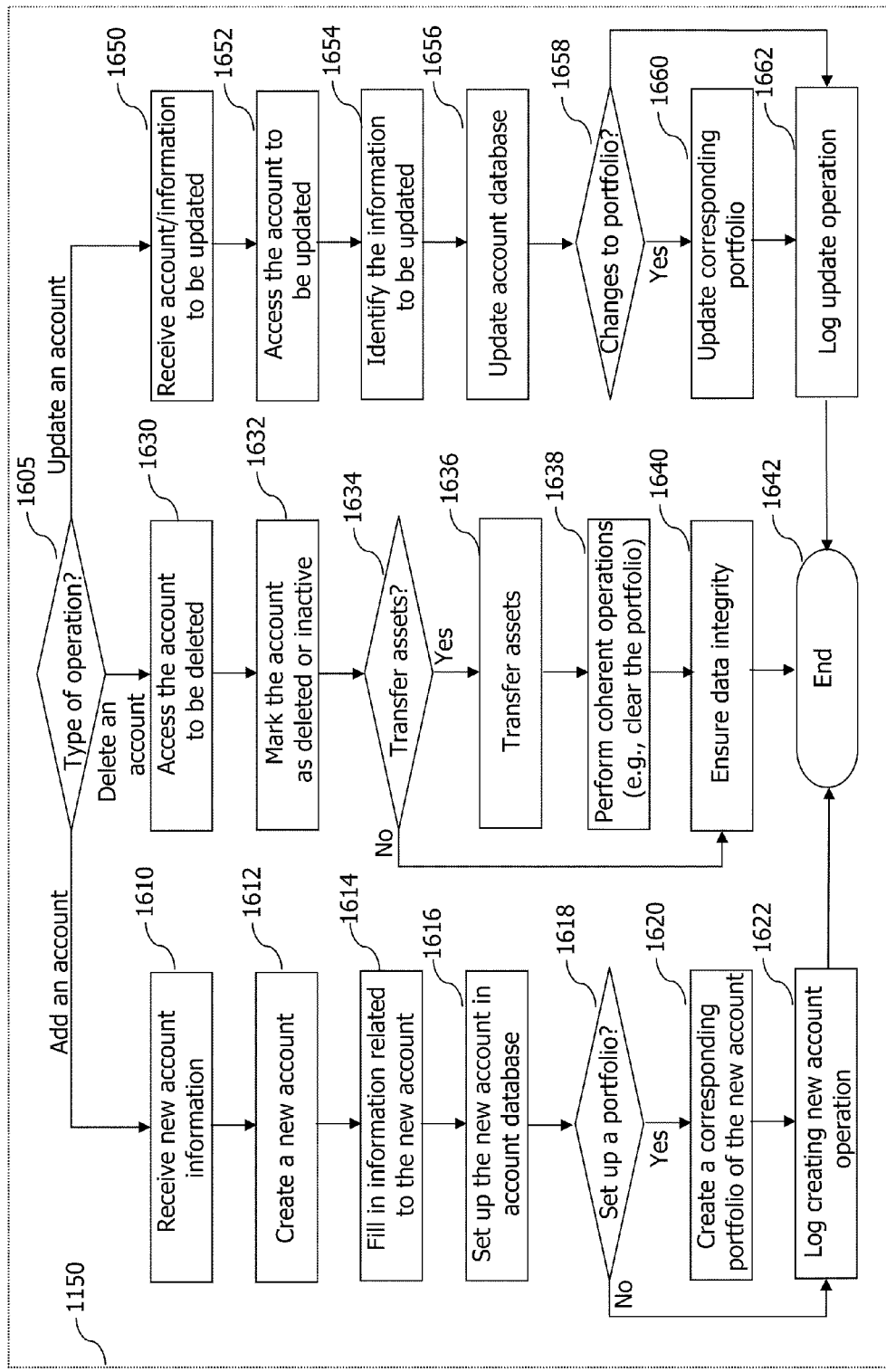
FIG. 16 is a flowchart of an exemplary process, in which an account management mechanism performs different account management operations.

FIG. 16 is a flowchart of an exemplary process, in which the account management mechanism 265 performs different account management operations. According to user's specification, the type of requested account management operation is first determined at act 1605. Three exemplary types of account management operations are described in FIG. 16. If a requested account management operation relates to adding a new account, information about the new account (which may be associated with a new user) is received at act 1610. A new account is then created, at act 1612, for the new user. Information about the new user is used to fill in, at act 1614, the details (e.g., address, social security number, etc.) before the new account is set up, at act 1616, in the account database.

If a portfolio associated with the account is to be set up, determined at act 1618, a corresponding portfolio is created, at act 1620, for the new account. At the initial stage of creating a new account, the portfolio may still be empty. In this case, a default empty portfolio may be used which may be later updated when trading activities occur. The operation of creating a new account may then be optionally logged at act 1622.

If the requested account management operation is to delete an existing account, the account to be deleted is accessed at act 1630. The account to be deleted may then be marked, at act 1632, as deleted or inactive. Alternatively, instead of marking the account as deleted, the account may also be physically deleted. The choice of means to delete an account may be determined according to the application requirement.

There may be additional operations associated with the deletion of an account. For example, if the holdings in the associated portfolio of the deleted account are not empty, the holdings (corresponding to assets) may need to be transferred. Furthermore, other operations that ensure the integrity of the account information may also be performed. For example, if the deleted account is associated with another existing account, such association may have to be removed once the deletion is effective.

If assets associated with the deleted account are to be transferred, determined at act 1634, the account management mechanism 265 transfers the assets at act 1636. Such transfer makes the portfolio of the deleted account empty. To make the account coherent, the account management mechanism 265 may also perform, at act 1638, other operations such as clearing the portfolio of the account to ensure that the deleted account has coherent information. The account management mechanism 265 further ensures, at act 1640, the integrity of the data in the account database. For example, any association of the deleted account with other accounts may be removed.

If the requested account management operation is an update operation, the update may be performed to either the information related to the underlying user or the portfolio of the account. The former may occur when, for example, the address of the user changed. The latter situation may occur when, for example, the portfolio of the user needs to be updated due to, for instance, trading activities. The information used to update the account is first received at act 1650. The account to be updated is then accessed at act 1652. Relevant information to be updated (e.g., address of the user) is identified at act 1654 and then updated at act 1656. Whether the portfolio associated with the account is to be updated is determined at act 1658. If changes to the portfolio are required, the portfolio is updated at act 1660. Then, the update operation performed is logged at act 1662. The account management operations of FIG. 16 end at act 1642.

Figure 17:
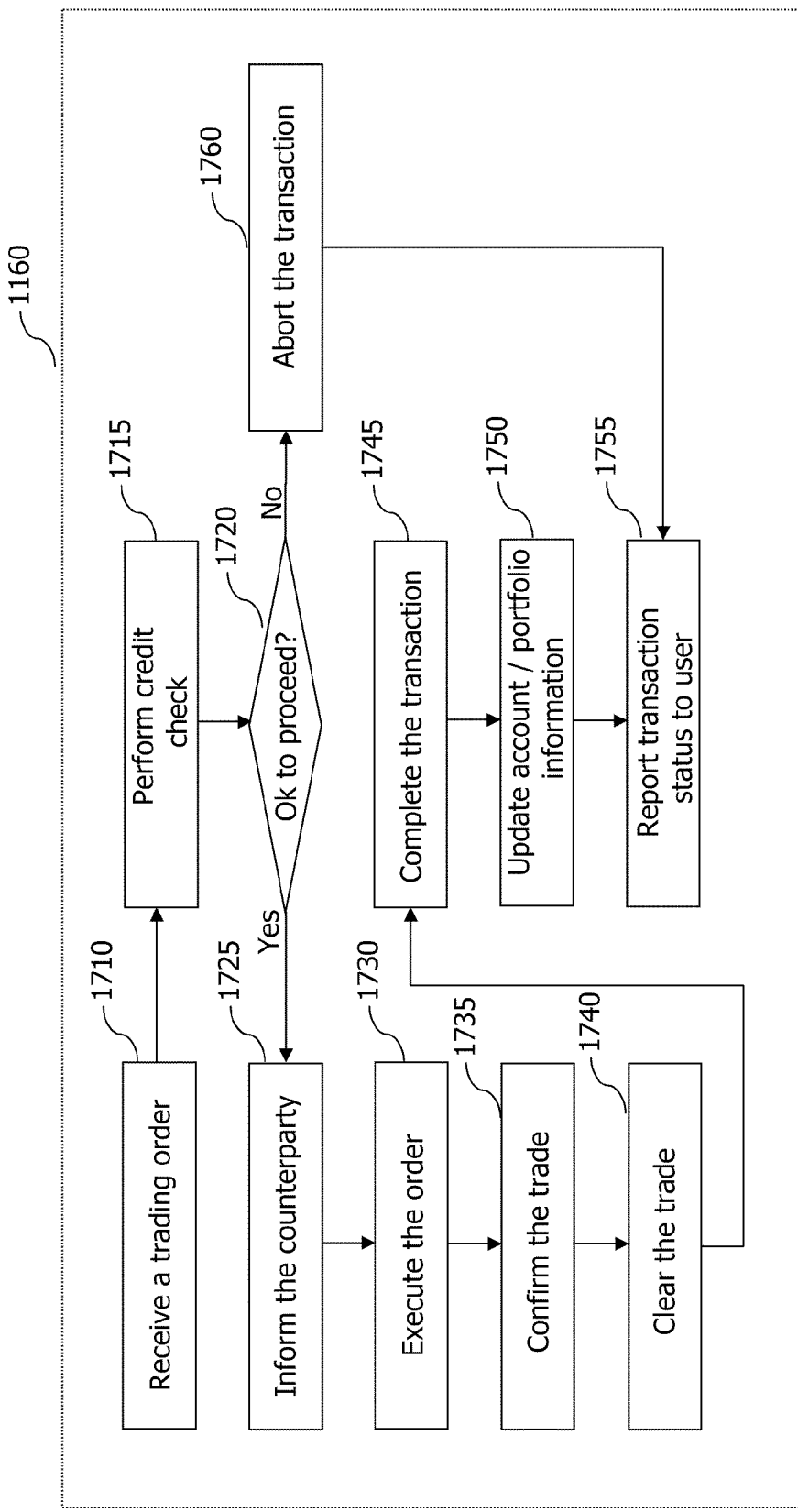
FIG. 17 is a flowchart of an exemplary process, in which a transaction processing mechanism performs operations to facilitate online trading of fixed income securities.

FIG. 17 is a flowchart of an exemplary process, in which the transaction processing mechanism 270 performs operations to facilitate online trading of fixed income securities. A trading order is first received at act 1710. The user may issue the trading order, which may include information such as what bond(s) to trade, the counterparty with whom the trade is to take place, the price at which the trade is conducted, and the quantity of the trade.

To move forward with the transaction, the transaction processing mechanism 270 may perform credit check at act 1715. If the credit check is not satisfactory, determined at act 1720, the transaction processing mechanism 270 may abort the transaction at act 1760. If the credit check is satisfactory, the transaction processing mechanism 270 proceeds with the transaction.

To complete the transaction, the transaction processing mechanism 270 informs, at act 1725, the specified counterparty of the trade. The trading order is then executed at act 1730. After the execution, the order is confirmed at act 1735. Before completing the transaction at act 1745, the order is cleared at act 1740. As part of the post processing associated with the transaction, the portfolio of the corresponding account is updated at act 1750. To do so, the portfolio update mechanism in the transaction processing mechanism 270 may be invoked to perform the update. Finally, the transaction reporting mechanism 1040 in the transaction processing mechanism 270 reports the transaction at act 1755. The reporting may include both reporting the status of the transaction (e.g., completed or aborted) to the user and reporting the details of the transaction (e.g., what bonds are traded at what price) to some designated authority (e.g., NASDAQ's TRACE).

While the inventions have been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method for visually presenting information related to fixed income security ratings, comprising:
    storing a plurality of symbolic ratings for a fixed income security in a storage device coupled to a hardware processor, wherein the plurality of symbolic ratings have different symbolic rating schemes to represent a credit quality of the fixed income security;
    converting, on the hardware processor, the plurality of symbolic ratings for the fixed income security into a rating value that represents the credit quality of the fixed income security, wherein the rating value represents the credit quality of the fixed income security as a function of the different symbolic rating schemes that the plurality of symbolic ratings have to represent the credit quality of the fixed income security; and
    generating, on the hardware processor, a visualization of the rating value that represents the credit quality of the fixed income security.

2. The method of claim 1, wherein the different symbolic rating schemes have different symbolic ratings that represent investment grade credit qualities for fixed income securities and different symbolic ratings that represent speculative grade credit qualities for fixed income securities.

3. The method of claim 1, wherein converting the plurality of symbolic ratings into the rating value includes mapping, on the hardware processor, the plurality of symbolic ratings to color code tuples, wherein the color code tuples mapped to the plurality of symbolic ratings represent the credit quality of the fixed income security as a function of the different symbolic rating schemes.

4. The method of claim 3, wherein converting the plurality of symbolic ratings into the rating value further includes blending the color code tuples mapped to the plurality of symbolic ratings to produce a blended color code, wherein the rating value includes the blended color code to represent the credit quality of the fixed income security as an average of the plurality of symbolic ratings.

5. The method of claim 3, wherein converting the plurality of symbolic ratings into the rating value further includes selecting one of the color code tuples mapped to the plurality of symbolic ratings that has a lightest color code, wherein the rating value includes the lightest color code to conservatively represent the credit quality of the fixed income security.

6. The method of claim 3, wherein converting the plurality of symbolic ratings into the rating value further includes selecting one of the color code tuples mapped to the plurality of symbolic ratings that has a darkest color code, wherein the rating value includes the darkest color code to optimistically represent the credit quality of the fixed income security.

7. The method of claim 3, wherein the visualization of the rating value that represents the credit quality of the fixed income security includes a row separately displaying the color code tuples mapped to the plurality of symbolic ratings.

8. The method of claim 1, wherein converting the plurality of symbolic ratings into the rating value includes mapping, on the hardware processor, the plurality of symbolic ratings to real values, wherein the real values mapped to the plurality of symbolic ratings represent the credit quality of the fixed income security as a function of the different symbolic rating schemes.

9. The method of claim 8, wherein converting the plurality of symbolic ratings into the rating value further includes averaging the real values mapped to the plurality of symbolic ratings to produce an averaged numeric value, wherein the rating value includes the averaged numeric value to represent the credit quality of the fixed income security as an average of the plurality of symbolic ratings.

10. The method of claim 8, wherein converting the plurality of symbolic ratings into the rating value further includes selecting one of the real values mapped to the plurality of symbolic ratings that has a lowest numeric value, wherein the rating value includes the lowest numeric value to conservatively represent the credit quality of the fixed income security.

11. The method of claim 8, wherein converting the plurality of symbolic ratings into the rating value further includes selecting one of the real values mapped to the plurality of symbolic ratings that has a highest numeric value, wherein the rating value includes the highest numeric value to optimistically represent the credit quality of the fixed income security.

12. The method of claim 1, wherein the visualization aggregates the rating value that represents the credit quality of the fixed income security with a time to maturity for the fixed income security and a percentage yield on the fixed income security.

13. A system for visually presenting information related to fixed income security ratings, comprising:
    a storage device comprising a computer-readable storage medium, wherein the storage device is configured to store a plurality of symbolic ratings that have different symbolic rating schemes to represent a credit quality of a fixed income security; and
    a hardware processor coupled to the storage device, wherein the hardware processor is configured to:
        convert the plurality of symbolic ratings for the fixed income security into a rating value that represents the credit quality of the fixed income security, wherein the rating value represents the credit quality of the fixed income security as a function of the different symbolic rating schemes that the plurality of symbolic ratings have to represent the credit quality of the fixed income security; and
        generate a visualization of the rating value that represents the credit quality of the fixed income security.

14. The system of claim 13, wherein the different symbolic rating schemes have different symbolic ratings that represent investment grade credit qualities for fixed income securities and different symbolic ratings that represent speculative grade credit qualities for fixed income securities.

15. The system of claim 13, wherein to convert the plurality of symbolic ratings into the rating value, the hardware processor is further configured to map the plurality of symbolic ratings to color code tuples, wherein the color code tuples mapped to the plurality of symbolic ratings represent the credit quality of the fixed income security as a function of the different symbolic rating schemes.

16. The system of claim 15, wherein to convert the plurality of symbolic ratings into the rating value, the hardware processor is further configured to blend the color code tuples mapped to the plurality of symbolic ratings to produce a blended color code, wherein the rating value includes the blended color code to represent the credit quality of the fixed income security as an average of the plurality of symbolic ratings.

17. The system of claim 15, wherein to convert the plurality of symbolic ratings into the rating value, the hardware processor is further configured to select one of the color code tuples mapped to the plurality of symbolic ratings that has a lightest color code, wherein the rating value includes the lightest color code to conservatively represent the credit quality of the fixed income security.

18. The system of claim 15, wherein to convert the plurality of symbolic ratings into the rating value, the hardware processor is further configured to select one of the color code tuples mapped to the plurality of symbolic ratings that has a darkest color code, wherein the rating value includes the darkest color code to optimistically represent the credit quality of the fixed income security.

19. The system of claim 15, wherein the visualization of the rating value that represents the credit quality of the fixed income security includes a row separately displaying the color code tuples mapped to the plurality of symbolic ratings.

20. The system of claim 13, wherein to convert the plurality of symbolic ratings into the rating value, the hardware processor is further configured to map the plurality of symbolic ratings to real values, wherein the real values mapped to the plurality of symbolic ratings represent the credit quality of the fixed income security as a function of the different symbolic rating schemes.

21. The system of claim 20, wherein to convert the plurality of symbolic ratings into the rating value, the hardware processor is further configured to average the real values mapped to the plurality of symbolic ratings to produce an averaged numeric value, wherein the rating value includes the averaged numeric value to represent the credit quality of the fixed income security as an average of the plurality of symbolic ratings.

22. The system of claim 20, wherein to convert the plurality of symbolic ratings into the rating value, the hardware processor is further configured to select one of the real values mapped to the plurality of symbolic ratings that has a lowest numeric value, wherein the rating value includes the lowest numeric value to conservatively represent the credit quality of the fixed income security.

23. The system of claim 20, wherein to convert the plurality of symbolic ratings into the rating value, the hardware processor is further configured to select one of the real values mapped to the plurality of symbolic ratings that has a highest numeric value, wherein the rating value includes the highest numeric value to optimistically represent the credit quality of the fixed income security.

24. The system of claim 13, wherein the visualization aggregates the rating value that represents the credit quality of the fixed income security with a time to maturity for the fixed income security and a percentage yield on the fixed income security.

\* \* \* \* \*